(12) United States Patent
Finkelstein et al.

(10) Patent No.: US 8,661,104 B2
(45) Date of Patent: Feb. 25, 2014

(54) CAPACITY PLANNING USING USER-LEVEL DATA AND UPWARD PROJECTIONS

(75) Inventors: Jeff Finkelstein, Alpharetta, GA (US); Sung-eun Kim, Marietta, GA (US)

(73) Assignee: Cox Communications, Inc., Atlanta, GA (US)

( * ) Notice: Subject to any disclaimer, the term of this patent is extended or adjusted under 35 U.S.C. 154(b) by 558 days.

(21) Appl. No.: 12/467,063

(22) Filed: May 15, 2009

(65) Prior Publication Data

US 2010/0290350 A1 Nov. 18, 2010

(51) Int. Cl.
*G06F 15/173* (2006.01)
(52) U.S. Cl.
USPC .......................................... 709/223; 709/224
(58) Field of Classification Search
USPC ........................................................ 709/223
See application file for complete search history.

(56) References Cited

U.S. PATENT DOCUMENTS

| | | | | |
|---|---|---|---|---|
| 5,974,127 A | * | 10/1999 | Wernli et al. | 379/201.01 |
| 5,991,735 A | * | 11/1999 | Gerace | 705/7.33 |
| 6,721,750 B1 | * | 4/2004 | Jones et al. | 707/603 |
| 6,963,912 B1 | * | 11/2005 | Schweitzer et al. | 709/224 |
| 2002/0108059 A1 | * | 8/2002 | Canion et al. | 713/201 |
| 2004/0240385 A1 | * | 12/2004 | Boggs et al. | 370/230 |
| 2005/0010468 A1 | * | 1/2005 | Power | 705/10 |
| 2005/0132051 A1 | * | 6/2005 | Hill et al. | 709/226 |
| 2007/0076728 A1 | * | 4/2007 | Rieger et al. | 370/401 |
| 2007/0118643 A1 | * | 5/2007 | Mishra et al. | 709/224 |
| 2007/0214483 A1 | * | 9/2007 | Bou-Abboud | 725/96 |
| 2008/0273591 A1 | * | 11/2008 | Brooks et al. | 375/240.01 |
| 2009/0070454 A1 | * | 3/2009 | McKinnon et al. | 709/224 |

* cited by examiner

*Primary Examiner* — Christopher Biagini
(74) *Attorney, Agent, or Firm* — Benjamin A. Balser; Balser & Grell IP Law

(57) ABSTRACT

A telecommunications network capacity planning system. The telecommunications network capacity planning system includes a telecommunications network including a telecommunications services provider, subscribers and a network coupling the telecommunications services provider and the subscribers for provisioning of the telecommunications services. A database system is used for collecting and storing data at the user-level associated with provisioning of telecommunication services over the telecommunications network. A processor is coupled to the database system. The processor models the telecommunications network by generating upward projections from the stored user-level data and transforms the modeling of the network to a visual display of capacity information and network parameters for manipulation to evaluate capacity planning scenarios.

19 Claims, 41 Drawing Sheets

Figure 2:
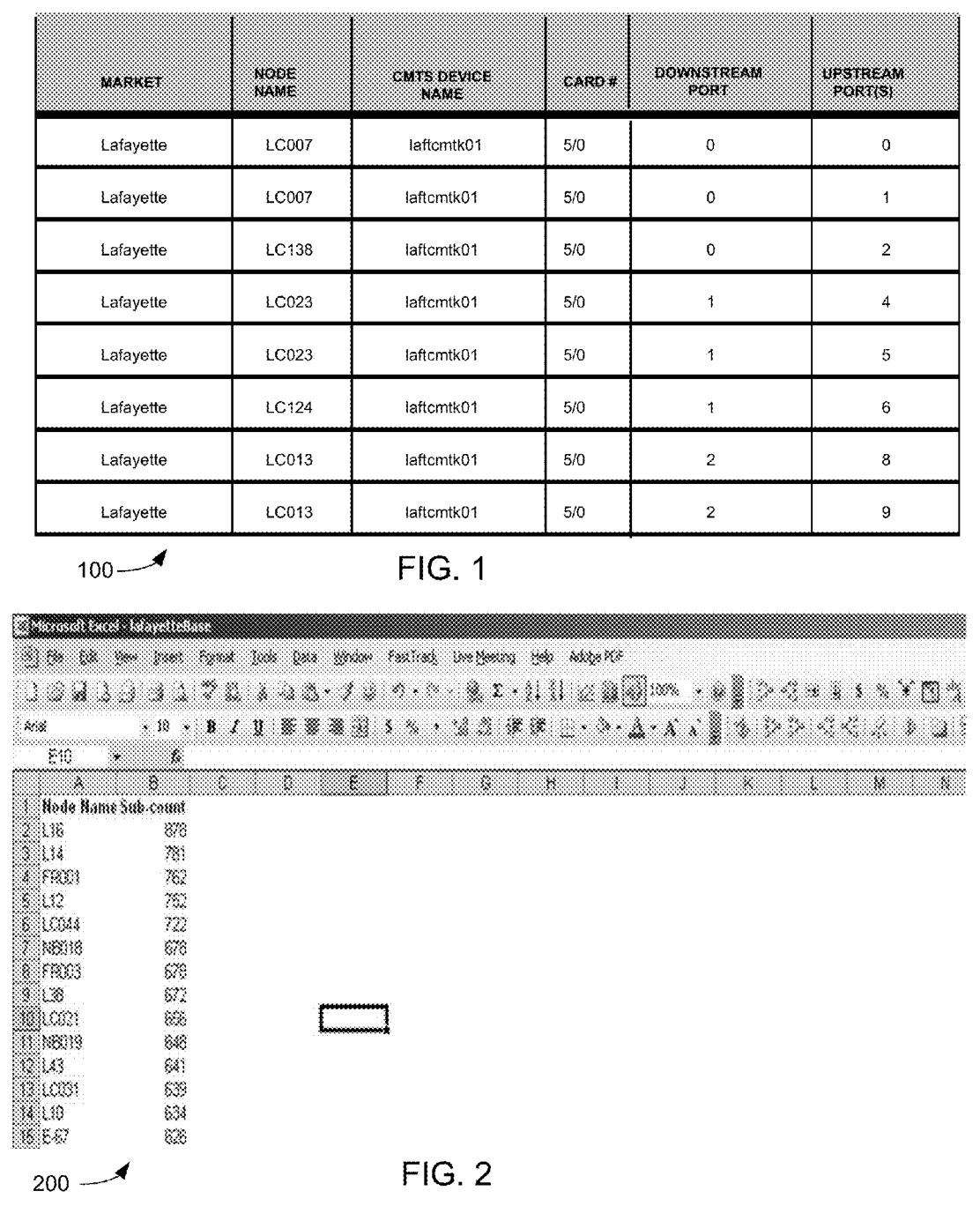

| MARKET | NODE NAME | CMTS DEVICE NAME | CARD # | DOWNSTREAM PORT | UPSTREAM PORT(S) |
|---|---|---|---|---|---|
| Lafayette | LC007 | laftcmtk01 | 5/0 | 0 | 0 |
| Lafayette | LC007 | laftcmtk01 | 5/0 | 0 | 1 |
| Lafayette | LC138 | laftcmtk01 | 5/0 | 0 | 2 |
| Lafayette | LC023 | laftcmtk01 | 5/0 | 1 | 4 |
| Lafayette | LC023 | laftcmtk01 | 5/0 | 1 | 5 |
| Lafayette | LC124 | laftcmtk01 | 5/0 | 1 | 6 |
| Lafayette | LC013 | laftcmtk01 | 5/0 | 2 | 8 |
| Lafayette | LC013 | laftcmtk01 | 5/0 | 2 | 9 |

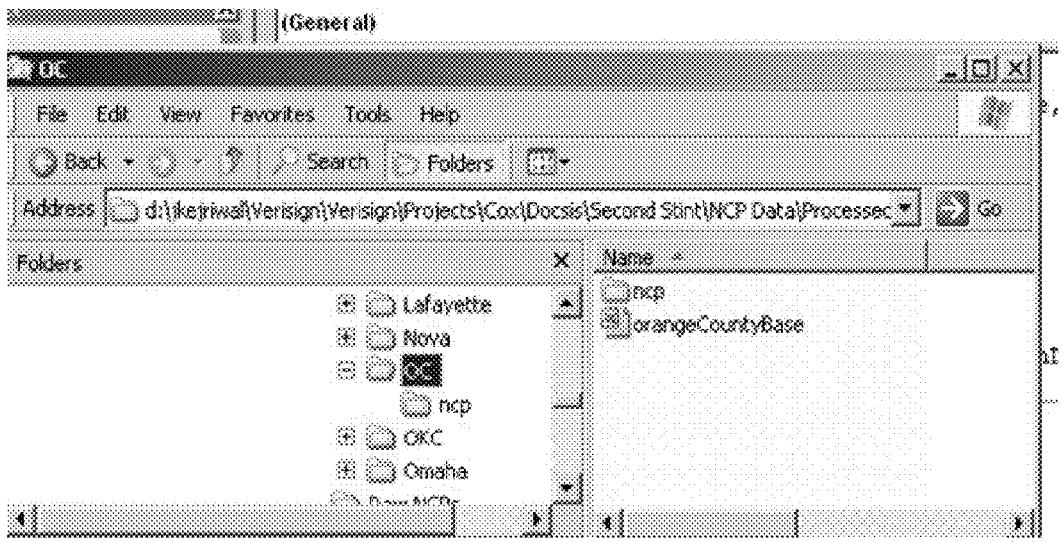

FIG. 7

| SG | Mkt | CMTS | # of Subs | #Ch | Node ID | Subs/Node | HHP/Node | Y0 Avg. Util | Y0 Peak Util |
|---|---|---|---|---|---|---|---|---|---|
| CHO1CMTB01_Cable2/1-downstream | Oklahoma | CHO1CMTB01 | 583 | 1 | 17SC | 154 | 235 | 24.67 | 59.13 |
| CHO1CMTB01_Cable2/1-downstream | Oklahoma | CHO1CMTB01 | | | 17SF | 57 | 100 | 24.67 | 59.13 |
| CHO1CMTB01_Cable2/1-downstream | Oklahoma | CHO1CMTB01 | | | 17TF | 78 | 119 | 24.67 | 59.13 |
| CHO1CMTB01_Cable2/1-downstream | Oklahoma | CHO1CMTB01 | | | 17KA | 99 | 143 | 24.67 | 59.13 |
| CHO1CMTB01_Cable2/1-downstream | Oklahoma | CHO1CMTB01 | | | 17MH | 36 | 81 | 24.67 | 59.13 |
| CHO1CMTB01_Cable2/1-downstream | Oklahoma | CHO1CMTB01 | | | 17TC | 128 | 257 | 24.67 | 59.13 |
| CHO1CMTB01_Cable2/1-downstream | Oklahoma | CHO1CMTB01 | | | 17MG | 31 | 51 | 24.67 | 59.13 |
| CHO1CMTB01_Cable2/2-downstream | Oklahoma | CHO1CMTB01 | 660 | 1 | 17KC | 129 | 298 | 22.19 | 44.85 |
| CHO1CMTB01_Cable2/2-downstream | Oklahoma | CHO1CMTB01 | | | 17LE | 49 | 69 | 22.19 | 44.85 |
| CHO1CMTB01_Cable2/2-downstream | Oklahoma | CHO1CMTB01 | | | 17TG | 80 | 235 | 22.19 | 44.85 |
| CHO1CMTB01_Cable2/2-downstream | Oklahoma | CHO1CMTB01 | | | 17KF | 50 | 109 | 22.19 | 44.85 |
| CHO1CMTB01_Cable2/2-downstream | Oklahoma | CHO1CMTB01 | | | 17KB | 154 | 276 | 22.19 | 44.85 |
| CHO1CMTB01_Cable2/2-downstream | Oklahoma | CHO1CMTB01 | | | 17SE | 198 | 414 | 22.19 | 44.85 |
| CHO1CMTB01_Cable3/1-downstream | Oklahoma | CHO1CMTB01 | 634 | 1 | 17SA | 85 | 121 | 26.03 | 53.71 |
| CHO1CMTB01_Cable3/1-downstream | Oklahoma | CHO1CMTB01 | | | 17KG | 62 | 132 | 26.03 | 53.71 |
| CHO1CMTB01_Cable3/1-downstream | Oklahoma | CHO1CMTB01 | | | 17KD | 331 | 388 | 26.03 | 53.71 |
| CHO1CMTB01_Cable3/1-downstream | Oklahoma | CHO1CMTB01 | | | 17LC | 156 | 248 | 26.03 | 53.71 |
| CHO1CMTB01_Cable3/2-downstream | Oklahoma | CHO1CMTB01 | 732 | 1 | 17TB | 197 | 570 | 28.14 | 77.8 |
| CHO1CMTB01_Cable3/2-downstream | Oklahoma | CHO1CMTB01 | | | 17TA | 106 | 414 | 28.14 | 77.8 |

| YO Peak UBI | Primary DS | Primary US | 2x8 DS | 2x8 US | TX32 | RX32 | MDE240 | 5x20 DS | 5x20 US | EQAM | Profile |
|---|---|---|---|---|---|---|---|---|---|---|---|
| 87.5 | 0 | 0 | 1 | 4 | 0 | 0 | 0 | 0 | 0 | 0 | 5 |
| 87.5 | | | | | | | | | | | 4 |
| 85.76 | 0 | 0 | 1 | 4 | 0 | 0 | 0 | 0 | 0 | 0 | 5 |
| 85.76 | | | | | | | | | | | 4 |
| 87.8 | 0 | 0 | 1 | 4 | 0 | 0 | 0 | 0 | 0 | 0 | 4 |
| 87.8 | | | | | | | | | | | 4 |
| 89.02 | 0 | 0 | 1 | 4 | 0 | 0 | 0 | 0 | 0 | 0 | 4 |
| 89.02 | | | | | | | | | | | 6 |
| 87.41 | 0 | 0 | 1 | 4 | 0 | 0 | 0 | 0 | 0 | 0 | 3 |
| 87.41 | | | | | | | | | | | 5 |
| 88.81 | 0 | 0 | 1 | 4 | 0 | 0 | 0 | 0 | 0 | 0 | 4 |
| 88.81 | | | | | | | | | | | 4 |
| 85.42 | 0 | 0 | 1 | 4 | 0 | 0 | 0 | 0 | 0 | 0 | 5 |
| 85.42 | | | | | | | | | | | 3 |
| 84.66 | 0 | 0 | 1 | 4 | 0 | 0 | 0 | 0 | 0 | 0 | 4 |
| 84.66 | | | | | | | | | | | 5 |
| 46.22 | 0 | 0 | 1 | 4 | 0 | 0 | 0 | 0 | 0 | 0 | 4 |

| CMTS | | | | Market |
|---|---|---|---|---|
| CHSPCMTK01 | | | | Hampton Roads |
| CHSPCMTK02 | | | | Hampton Roads |
| CHSPCMTK03 | | | | Hampton Roads |
| HCKYCMTK01 | | | | Hampton Roads |
| HCKYCMTK02 | | | | Hampton Roads |
| NRFKCMTK01 | | | | Hampton Roads |
| NRFKCMTK03 | | | | Hampton Roads |
| NRFKCMTK04 | | | | Hampton Roads |
| NWPTCMTK01 | | | | Hampton Roads |
| NWPTCMTK02 | | | | Hampton Roads |
| NWPTCMTK05 | | | | Hampton Roads |
| NWPTCMTK06 | | | | Hampton Roads |
| ALPNCMTK01 | | | | San Diego |
| CV1XCMTB01 | | | | San Diego |
| CV1XCMTB02 | | | | San Diego |
| CV1XCMTB03 | | | | San Diego |

| | 2008 | 2009 | 2010 | 2011 | 2012 | 2013 |
|---|---|---|---|---|---|---|
| Arkansas | 1 | 1 | 1 | 1 | 1 | 1 |
| Baton Rouge | 1 | 1 | 1 | 1 | 1 | 1 |
| Cleveland | 1 | 1 | 1 | 1 | 1 | 1 |
| Connecticut | 1 | 1 | 1 | 1 | 1 | 1 |
| Gainesville | 1 | 1 | 1 | 1 | 1 | 1 |
| Gulf Coast | 1 | 1 | 1 | 1 | 1 | 1 |
| Hampton Roads | 3 | 3 | 3 | 3 | 3 | 3 |
| Lafayette | 1 | 1 | 1 | 1 | 1 | 1 |
| Las Vegas | 2 | 2 | 2 | 2 | 2 | 2 |
| Macon | 1 | 1 | 1 | 1 | 1 | 1 |
| New Orleans | 1 | 1 | 1 | 1 | 1 | 1 |
| Northern Virginia | 3 | 3 | 3 | 3 | 3 | 3 |
| Oklahoma City | 1 | 1 | 1 | 1 | 1 | 1 |
| Omaha | 2 | 2 | 2 | 2 | 2 | 2 |
| Orange County | 1 | 1 | 1 | 1 | 1 | 1 |
| Palos Verdes | 3 | 3 | 3 | 3 | 3 | 3 |
| Phoenix | 2 | 2 | 2 | 2 | 2 | 2 |
| Rhode Island | 3 | 3 | 3 | 3 | 3 | 3 |
| Roanoke | 1 | 1 | 1 | 1 | 1 | 1 |
| San Diego | 1 | 1 | 1 | 1 | 1 | 1 |
| Santa Barbara | 1 | 1 | 1 | 1 | 1 | 1 |
| Sun Valley | 1 | 1 | 1 | 1 | 1 | 1 |
| Tulsa | 1 | 1 | 1 | 1 | 1 | 1 |
| Tucson | 1 | 1 | 1 | 1 | 1 | 1 |
| Wichita | 1 | 1 | 1 | 1 | 1 | 1 |

| EQUIPMENT PARAMETERS | | | | |
|---|---|---|---|---|
| ABC | | | | |
| CHASSIS: | | | | |
| Useable Line Card Slots per Chassis | 7 | 7 | 7 | 7 |
| Spa Cards per Chassis | 0 | 0 | 3 | 5 |
| 3G60 Cards per Chassis | 0 | 0 | 0 | 0 |
| 3G60 Upstream Channels per Port | 0 | 0 | 0 | 0 |

| MIGRATION OPTIONS | | | | |
|---|---|---|---|---|
| Migrate to different CMTS: | ENABLED | ENABLED | ENABLED | ENABLED |
| Migrating Port: | 5x20 DS | 5x20 DS | 5x20 DS | 5x20 D |
| Only migrate if SG does not contain: | 5x20 DS | 5x20 DS | 5x20 DS | 5x20 D |

FIG. 19

UTILIZATION PER AVERAGE SUBSCRIBER

Busy Hour Downstream Bandwidth Requirement at the Cable Modem

| | | | |
|---|---|---|---|
| Premier | 0.341 | 0.397 | 0.449 |
| Preferred | 0.246 | 0.286 | 0.349 |
| Value | 0.060 | 0.099 | 0.099 |
| Economy | 0.043 | 0.070 | 0.070 |
| Tier 5 | 0.000 | 0.000 | 0.000 |

Busy Hour Upstream Bandwidth Requirement at the Cable Modem

| | | | |
|---|---|---|---|
| Premier | 0.110 | 0.110 | 0.110 |
| Preferred | 0.080 | 0.106 | 0.106 |
| Value | 0.023 | 0.025 | 0.031 |
| Economy | 0.021 | 0.021 | 0.026 |
| Tier 5 | 0.000 | 0.000 | 0.000 |

CAP AND GROW

| | |
|---|---|
| CAP AND GROW FUNCTION: | ENABLED |
| CMTS VENDOR TO CAP: | XYZ |
| YEAR TO PERFORM CAP: | 2008 |

EQAM DEVICE:
EQAM Device of Choice: RF GATEWAY 10

RF GATEWAY 10:

| | | | | |
|---|---|---|---|---|
| EQAM Ports Per CMTS | 35 | | | |
| Availability | N/A | N/A | AVAILABLE | AVAILABLE |
| Maximum Channels per Port | 0 | 0 | 2 | 3 |

NSG9000:

| | | | | |
|---|---|---|---|---|
| EQAM Ports Per EQAM Device | 18 | | | |
| Devices per CMTS | 0 | 0 | 2 | 2 |
| Maximum Channels per Port | 0 | 0 | 2 | 3 |

FIG. 24  2400

| ABC | | | | |
|---|---|---|---|---|
| CHASSIS: | | | | |
| Useable Line Card Slots per Chassis | 7 | 7 | 7 | 7 |
| Spa Cards per Chassis | 0 | 0 | 3 | 5 |
| 3G60 Cards per Chassis | 0 | 0 | 0 | 0 |
| 3G60 Upstream Channels per Port | 0 | 0 | 0 | 0 |

FIG. 25    2500

| MIGRATION OPTIONS | | | | |
|---|---|---|---|---|
| Migrate to different CMTS: | DISABLED | DISABLED | DISABLED | DISABLED |
| Migrating Port: | | | | |
| Only migrate if SG does not contain: | | | | |
| Port Addition 1 | DISABLED | DISABLED | ENABLED | ENABLED |
| Existing Port | | | 5x20 DS | 5x20 DS |
| Augmenting Port | | | EQAM | EQAM |

FIG. 26    2600

| XYZ | 2008 | 2009 | 2010 | 2011 | 2012 | 2013 |
|---|---|---|---|---|---|---|
| | SW RELEASE 5.0 | SW RELEASE 5.2 | SW RELEASE 6 | SW RELEASE 7 | SW RELEASE 7 | SW RELEASE 7 |
| Useable 2X8 Line Card Slots per Chassis | 11 | 8 | 0 | 0 | 0 | 0 |
| Usable TX-32 Line Cards per Chassis | 0 | 2 | 4 | 4 | 4 | 4 |
| Usable RX-32 Line Cards per Chassis | 0 | 0 | 4 | 4 | 4 | 4 |
| Usable MDE-48 Cards | 0 | 0 | 0 | 0 | 0 | 0 |
| Usable MDE-240 Cards | 0 | 0 | 0 | 0 | 1 | 1 |
| QAMS per TX-32 Port | 0 | 2 | 3 | 4 | 4 | 4 |
| QAMS per RX-32 Port | 0 | 0 | 3 | 4 | 4 | 4 |

FIG. 27  2700

| MIGRATION OPTIONS | | | | | | |
|---|---|---|---|---|---|---|
| Migrate to different CMTS: | DISABLED | ENABLED | ENABLED | DISABLED | DISABLED | DISABLED |
| Migrating Port: | | 2x8 DS | 2x8 DS | | | |
| Only migrate if SG does not contain: | | TX32 | TX32 | | | |
| Port Addition 1 | DISABLED | ENABLED | ENABLED | DISABLED | ENABLED | ENABLED |
| Existing Port | | 2x8 DS | 2x8 DS | | TX32 | TX32 |
| Augmenting Port | | TX32 | TX32 | | MDE240 | MDE240 |
| Port Addition 2 | DISABLED | DISABLED | ENABLED | DISABLED | DISABLED | DISABLED |
| Existing Port | | | TX32 | | | |
| Augmenting Port | | | RX32 | | | |
| Primary Port Change | DISABLED | DISABLED | ENABLED | DISABLED | DISABLED | DISABLED |
| If contains: | | | RX32 | | | |
| New Primary: | | | TX32 | | | |
| Old Primary: | | | 2x8 DS | | | |
| Migrate all Legacies | DISABLED | DISABLED | ENABLED | DISABLED | DISABLED | DISABLED |
| Migrate from: | | | 2x8 DS | | | |
| Migrate to (Downstream): | | | TX32 | | | |
| Migrate to (Upstream): | | | RX32 | | | |

FIG. 28  2800

| ASSUMPTIONS AND KEY INPUTS | |
|---|---|
| Item | Value |
| Pops growth rate | 0.96% |
| HH to Pops | 2.61 |
| MSO coverage CAGR | 0.24% |
| Start Year | 2007 |

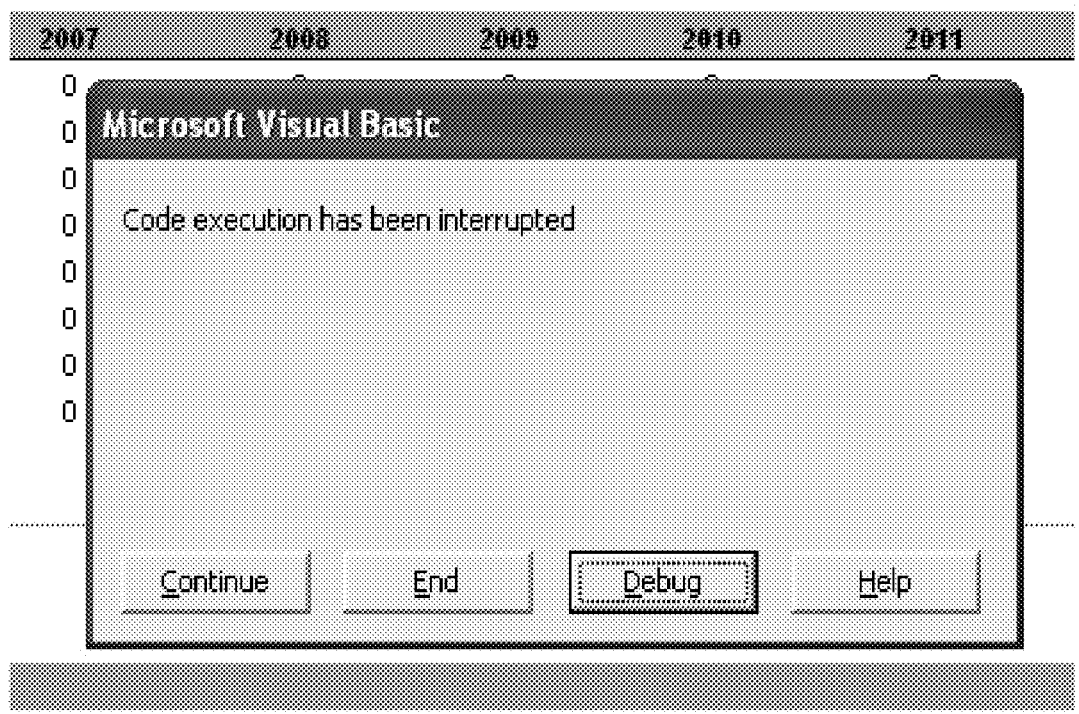
FIG. 30    3000

| MARKET NODE SPLIT COST | 2008 | 2009 | 2010 | 2011 | 2012 | 2013 |
|---|---|---|---|---|---|---|
| Arkansas | $25,000 | $25,000 | $25,000 | $25,000 | $25,000 | $25,000 |
| Baton Rouge | $25,000 | $25,000 | $25,000 | $25,000 | $25,000 | $25,000 |
| Cleveland | $25,000 | $25,000 | $25,000 | $25,000 | $25,000 | $25,000 |
| Connecticut | $25,000 | $25,000 | $25,000 | $25,000 | $25,000 | $25,000 |
| Gainesville | $25,000 | $25,000 | $25,000 | $25,000 | $25,000 | $25,000 |
| Gulf Coast | $25,000 | $25,000 | $25,000 | $25,000 | $25,000 | $25,000 |
| Hampton Roads | $25,000 | $25,000 | $25,000 | $25,000 | $25,000 | $25,000 |
| Lafayette | $25,000 | $25,000 | $25,000 | $25,000 | $25,000 | $25,000 |
| Las Vegas | $31,181 | $31,181 | $31,181 | $31,181 | $31,181 | $31,181 |
| Macon | $25,000 | $25,000 | $25,000 | $25,000 | $25,000 | $25,000 |
| New Orleans | $25,000 | $25,000 | $25,000 | $25,000 | $25,000 | $25,000 |
| Northern Virginia | $25,000 | $25,000 | $25,000 | $25,000 | $25,000 | $25,000 |
| Oklahoma City | $25,000 | $25,000 | $25,000 | $25,000 | $25,000 | $25,000 |
| Omaha | $25,000 | $25,000 | $25,000 | $25,000 | $25,000 | $25,000 |
| Orange County | $25,000 | $25,000 | $25,000 | $25,000 | $25,000 | $25,000 |
| Palos Verdes | $25,000 | $25,000 | $25,000 | $25,000 | $25,000 | $25,000 |
| Phoenix | $25,000 | $25,000 | $25,000 | $25,000 | $25,000 | $25,000 |
| Rhode Island | $25,000 | $25,000 | $25,000 | $25,000 | $25,000 | $25,000 |
| Roanoke | $25,000 | $25,000 | $25,000 | $25,000 | $25,000 | $25,000 |
| San Diego | $25,000 | $25,000 | $25,000 | $25,000 | $25,000 | $25,000 |
| Santa Barbara | $25,000 | $25,000 | $25,000 | $25,000 | $25,000 | $25,000 |
| Sun Valley | $25,000 | $25,000 | $25,000 | $25,000 | $25,000 | $25,000 |
| Tulsa | $25,000 | $25,000 | $25,000 | $25,000 | $25,000 | $25,000 |
| Tucson | $25,000 | $25,000 | $25,000 | $25,000 | $25,000 | $25,000 |
| Wichita | $25,000 | $25,000 | $25,000 | $25,000 | $25,000 | $25,000 |

| NODE SPLIT INSTALL COSTS | | | | | |
|---|---|---|---|---|---|
| Arkansas | $15,000 | $15,000 | $15,000 | $15,000 | $15,000 |
| Baton Rouge | $15,000 | $15,000 | $15,000 | $15,000 | $15,000 |
| Cleveland | $15,000 | $15,000 | $15,000 | $15,000 | $15,000 |
| Connecticut | $15,000 | $15,000 | $15,000 | $15,000 | $15,000 |
| Gainesville | $15,000 | $15,000 | $15,000 | $15,000 | $15,000 |
| Gulf Coast | $15,000 | $15,000 | $15,000 | $15,000 | $15,000 |
| Hampton Roads | $26,000 | $26,000 | $26,000 | $26,000 | $26,000 |
| Lafayette | $15,000 | $15,000 | $15,000 | $15,000 | $15,000 |
| Las Vegas | $28,266 | $28,266 | $28,266 | $28,266 | $28,266 |
| Macon | $15,000 | $15,000 | $15,000 | $15,000 | $15,000 |
| New Orleans | $15,000 | $15,000 | $15,000 | $15,000 | $15,000 |
| Northern Virginia | $15,000 | $15,000 | $15,000 | $15,000 | $15,000 |
| Oklahoma City | $15,000 | $15,000 | $15,000 | $15,000 | $15,000 |
| Omaha | $15,000 | $15,000 | $15,000 | $15,000 | $15,000 |
| Orange County | $15,000 | $15,000 | $15,000 | $15,000 | $15,000 |
| Palos Verdes | $15,000 | $15,000 | $15,000 | $15,000 | $15,000 |
| Phoenix | $15,000 | $15,000 | $15,000 | $15,000 | $15,000 |
| Rhode Island | $15,000 | $15,000 | $15,000 | $15,000 | $15,000 |
| Roanoke | $15,000 | $15,000 | $15,000 | $15,000 | $15,000 |
| San Diego | $15,000 | $15,000 | $15,000 | $15,000 | $15,000 |
| Santa Barbara | $15,000 | $15,000 | $15,000 | $15,000 | $15,000 |
| Sun Valley | $15,000 | $15,000 | $15,000 | $15,000 | $15,000 |
| Tulsa | $15,000 | $15,000 | $15,000 | $15,000 | $15,000 |
| Tucson | $15,000 | $15,000 | $15,000 | $15,000 | $15,000 |
| Wichita | $15,000 | $15,000 | $15,000 | $15,000 | $15,000 |

3300 → NODE DECOMBINE COSTS
Average Decombine Cost — $200

FIG. 33

3400 → NODE DECOMBINE INSTALL COSTS
Decombine Install Costs — $50

FIG. 34

3500 → SALES TAX
Tax Rate — 8% — Yes

FIG. 35

3600 → SALES TAX
Tax Rate — 8% — No

FIG. 36

3700 → SHIPPING & HANDLING COSTS
CMTS Equipment — 10% — Yes
Blades — 10% — Yes

FIG. 37

3800 → SHIPPING & HANDLING COSTS
CMTS Equipment — 10% — No
Blades — 10% — Yes

FIG. 38

NETWORK SHARE BETWEEN MARKETS
*Based on HHP in 2007*

| MARKET | Share of Total HHP | Share of Network Group |
|---|---|---|
| Arkansas | 2.8% | 100.0% |
| Baton Rouge | 3.2% | 63.2% |
| Cleveland | 1.2% | 100.0% |
| Connecticut | 2.2% | 30.2% |
| Gainesville | 1.7% | 100.0% |
| Gulf Coast | 2.6% | 100.0% |
| Hampton Roads | 7.3% | 100.0% |
| Lafayette | 1.9% | 36.8% |
| Las Vegas | 8.6% | 100.0% |
| Macon | 1.5% | 100.0% |
| New Orleans | 4.2% | 100.0% |
| Northern Virginia | 4.4% | 100.0% |
| Oklahoma City | 4.9% | 100.0% |
| Omaha | 3.6% | 96.3% |
| Orange County | 3.9% | 91.7% |
| Palos Verdes | 0.4% | 8.3% |
| Phoenix | 17.9% | 86.6% |
| Rhode Island | 5.1% | 69.8% |
| Roanoke | 0.9% | 100.0% |
| San Diego | 8.8% | 100.0% |
| Santa Barbara | 1.0% | 100.0% |
| Sun Valley | 0.1% | 3.7% |
| Tulsa | 3.2% | 100.0% |
| Tucson | 2.8% | 13.4% |
| Wichita | 5.7% | 100.0% |

| CAPEX (000s) | 2008 $ | 2009 $ | 2010 $ | 2011 $ | 2012 $ | 2013 $ |
|---|---|---|---|---|---|---|
| NODE SPLIT CAPEX | $37,686 | $7,272 | $3,189 | $9,382 | $59,990 | $80 |
| CMTS CAPEX | $108,103 | $89,874 | $61,101 | $30,026 | $101,924 | $4,143 |
| TOTAL ANNUAL CAPEX | $145,789 | $97,147 | $64,290 | $39,409 | $161,914 | $4,223 |
| CUMULATIVE TOTAL | $512,771 | | | | | |
| EON CMTS/Node Split Capex POR | $79,182 | $82,385 | $59,040 | $0 | $0 | $0 |
| Variance to EON CMTS/NS POR | $66,607 | $14,761 | $5,250 | $39,409 | $161,914 | $4,223 |
| Cumulative | $66,607 | $81,369 | $86,619 | $126,027 | $287,941 | $292,164 |

| TOTAL CAPEX ($) | 2008 | 2009 | 2010 | 2011 | 2012 | 2013 |
|---|---|---|---|---|---|---|
| TOTAL CMTS CAPEX | $5,195,038 | $1,754,574 | $7,821,262 | $5,668,566 | $13,504,732 | $0 |
| TOTAL NODE SPLIT CAPEX | $356,682 | $2,021,198 | $1,367,281 | $4,161,290 | $8,619,815 | $0 |
| TOTAL CAPEX | $5,551,720 | $3,775,772 | $9,188,543 | $9,829,856 | $22,124,547 | $0 |
| CUMULATIVE CMTS CAPEX | $33,944,172 | | | | | |
| CUMULATIVE NODE SPLIT CAPEX | $16,526,266 | | | | | |
| CUMULATIVE CAPEX | $50,470,438 | | | | | |
| EON CMTS ADJUSTED CAPEX BUDGET | $6,187,062 | $3,069,000 | $3,069,000 | $0 | $0 | $0 |
| Variance to CMTS BUDGET | ($992,024) | ($1,314,426) | $4,752,262 | $5,668,566 | $13,504,732 | $0 |
| Cumulative | ($992,024) | ($2,306,450) | $2,445,812 | $8,114,378 | $21,619,110 | $21,619,110 |
| EON NODE SPLIT ADJUSTED CAPEX BUDGE | $7,376,187 | $10,473,223 | $8,562,408 | $0 | $0 | $0 |
| Variance to NODE SPLIT BUDGET | ($7,019,505) | ($8,452,025) | ($7,195,127) | $4,161,290 | $8,619,815 | $0 |
| Cumulative | ($7,019,505) | ($15,471,530) | ($22,666,658) | ($18,505,368) | ($9,885,553) | ($9,885,553) |
| EON TOTAL ADJUSTED CAPEX BUDGET | $13,563,249 | $13,542,223 | $11,631,408 | $0 | $0 | $0 |
| Variance to TOTAL BUDGET | ($8,011,529) | ($9,766,451) | ($2,442,865) | $9,829,856 | $22,124,547 | $0 |
| Cumulative | ($8,011,529) | ($17,777,980) | ($20,220,845) | ($10,390,989) | $11,733,558 | $11,733,558 |

| TOTAL CAPEX BY MARKET ($) | 2008 | 2009 | 2010 | 2011 | 2012 | 2013 |
|---|---|---|---|---|---|---|
| Arkansas | $4,310,230 | $3,357,296 | $2,966,100 | $912,560 | $8,910,522 | $0 |
| Baton Rouge | $2,621,217 | $3,982,669 | $1,462,107 | $1,084,402 | $3,096,364 | $0 |
| Cleveland | $373,819 | $994,364 | $736,690 | $40,000 | $1,565,062 | |
| Connecticut | $7,981,257 | $4,689,343 | $1,291,352 | $713,672 | $3,869,083 | $438,632 |
| Gainesville | $1,741,353 | $2,521,460 | $1,169,686 | $784,843 | $1,827,828 | $0 |
| Gulf Coast | $5,512,202 | $4,229,151 | $1,404,883 | $3,002,807 | $2,564,240 | $0 |
| Hampton Roads | $8,270,806 | $6,400,926 | $4,093,900 | $2,949,128 | $13,751,983 | $48,790 |
| Lafayette | $3,290,668 | $2,236,706 | $1,461,329 | $677,533 | $5,176,056 | $292,421 |
| Las Vegas | $5,551,720 | $3,775,772 | $9,188,543 | $9,829,856 | $22,124,547 | $0 |
| Macon | $1,326,456 | $2,046,051 | $682,317 | $558,207 | $2,190,073 | $0 |
| New Orleans | $1,533,049 | $5,443,877 | $1,754,528 | $957,264 | $3,816,497 | $0 |
| Northern Virginia | $6,974,368 | $5,056,216 | $4,776,216 | $2,508,108 | $2,524,158 | $0 |
| Oklahoma City | $14,185,394 | $6,269,368 | $1,878,543 | $1,364,633 | $7,269,821 | $1,462,107 |
| Omaha | $4,978,772 | $3,809,734 | $3,303,300 | $277,520 | $9,526,532 | $0 |
| Orange County | $3,911,514 | $8,374,233 | $3,116,866 | $1,364,633 | $6,040,890 | $0 |
| Palos Verdes | $1,446,819 | $839,324 | $503,880 | $0 | $1,108,462 | $0 |
| Phoenix | $19,176,545 | $6,044,751 | $8,172,222 | $6,698,397 | $21,222,886 | $88,790 |
| Rhode Island | $8,092,748 | $4,294,886 | $1,753,684 | $2,840,879 | $12,807,339 | $1,852,055 |
| Roanoke | $659,780 | $508,470 | $332,421 | $146,211 | $136,799 | $40,000 |
| San Diego | $7,212,363 | $4,532,858 | $3,970,291 | $2,368,336 | $9,025,012 | $0 |
| Santa Barbara | $2,646,423 | $1,317,126 | $1,011,480 | $120,000 | $2,314,556 | $0 |
| Sun Valley | $740,350 | $361,522 | $193,800 | $0 | $402,014 | $0 |
| Tulsa | $18,831,994 | $9,361,439 | $3,034,756 | $1,249,778 | $4,243,649 | $0 |
| Tucson | $3,122,286 | $633,580 | $1,267,159 | $769,879 | $778,437 | $0 |
| Wichita | $6,170,191 | $5,901,346 | $4,820,890 | $357,770 | $15,527,572 | $0 |
| TOTAL ANNUAL CAPEX | $140,662,323 | $96,982,467 | $64,346,944 | $41,576,414 | $161,822,384 | $4,222,796 |
| | | | | | | |
| CUMULATIVE CAPEX | $509,613,328 | | | | | |
| EON TOTAL ADJUSTED CAPEX BUDGET | $79,181,683 | $82,385,297 | $59,040,291 | $0 | $0 | $0 |
| Variance to TOTAL BUDGET | $61,480,640 | $14,597,169 | $5,306,654 | $41,576,414 | $161,822,384 | $4,222,796 |
| Cumulative | $61,480,640 | $76,077,810 | $81,384,463 | $122,960,877 | $284,783,262 | $289,006,057 |
| | | | | | | |
| 2008 JAN-JUN YTD SPEND (All Mkts) | $72,930,611 | | | | | |

| NODE SPLIT CAPEX BY MARKET ($) | 2008 | 2009 | 2010 | 2011 | 2012 | 2013 |
|---|---|---|---|---|---|---|
| Arkansas | $840,000 | $0 | $640,000 | $680,000 | $3,240,000 | $0 |
| Baton Rouge | $360,000 | $0 | $0 | $160,000 | $1,280,000 | $0 |
| Cleveland | $80,000 | $0 | $0 | $40,000 | $280,000 | $0 |
| Connecticut | $3,920,000 | $0 | $0 | $120,000 | $520,000 | $0 |
| Gainesville | $120,000 | $0 | $0 | $200,000 | $1,040,000 | $0 |
| Gulf Coast | $1,800,000 | $40,000 | $40,000 | $440,000 | $1,600,000 | $0 |
| Hampton Roads | $969,000 | $969,000 | $0 | $612,000 | $5,967,000 | $0 |
| Lafayette | $1,040,000 | $0 | $160,000 | $240,000 | $1,480,000 | $0 |
| Las Vegas | $356,682 | $2,021,198 | $1,367,281 | $4,161,290 | $8,619,815 | $0 |
| Macon | $0 | $0 | $0 | $120,000 | $920,000 | $0 |
| New Orleans | $480,000 | $0 | $0 | $80,000 | $1,600,000 | $0 |
| Northern Virginia | $0 | $280,000 | $0 | $120,000 | $1,640,000 | $0 |
| Oklahoma City | $6,240,000 | $1,160,000 | $0 | $0 | $2,640,000 | $0 |
| Omaha | $960,000 | $0 | $200,000 | $200,000 | $3,480,000 | $0 |
| Orange County | $3,040,000 | $360,000 | $0 | $0 | $2,560,000 | $0 |
| Palos Verdes | $1,160,000 | $0 | $0 | $0 | $0 | $0 |
| Phoenix | $2,080,000 | $1,160,000 | $360,000 | $1,680,000 | $9,480,000 | $40,000 |
| Rhode Island | $960,000 | $1,280,000 | $0 | $800,000 | $5,040,000 | $0 |
| Roanoke | $0 | $120,000 | $40,000 | $0 | $40,000 | $40,000 |
| San Diego | $2,080,000 | $120,000 | $0 | $200,000 | $3,200,000 | $0 |
| Santa Barbara | $1,880,000 | $0 | $120,000 | $120,000 | $600,000 | $0 |
| Sun Valley | $440,000 | $0 | $0 | $0 | $0 | $0 |
| Tulsa | $8,760,000 | $40,000 | $0 | $120,000 | $520,000 | $0 |
| Tucson | $360,000 | $0 | $0 | $40,000 | $440,000 | $0 |
| Wichita | $120,000 | $0 | $0 | $280,000 | $4,360,000 | $0 |
| TOTAL ANNUAL CAPEX | $38,045,682 | $7,550,198 | $3,327,281 | $10,413,290 | $60,546,815 | $80,000 |
| CUMULATIVE CAPEX | $119,963,266 | | | | | |
| EON TOTAL ADJUSTED CAPEX BUDGET | $43,481,046 | $32,166,228 | $23,576,011 | $0 | $0 | $0 |
| Variance to TOTAL BUDGET | ($5,435,364) | ($24,616,030) | ($20,248,730) | $10,413,290 | $60,546,815 | $80,000 |
| Cumulative | ($5,435,364) | ($30,051,394) | ($50,300,124) | ($39,886,834) | $20,659,981 | $20,739,981 |
| 2008 JAN-JUN YTD SPEND (All Mkts) | $16,575,422 | | | | | |

| CMTS CAPEX BY MARKET ($) | 2008 | 2009 | 2010 | 2011 | 2012 | 2013 |
|---|---|---|---|---|---|---|
| Arkansas | $3,470,230 | $3,357,296 | $2,326,100 | $232,560 | $5,670,522 | $0 |
| Baton Rouge | $2,261,217 | $3,982,669 | $1,462,107 | $924,402 | $1,816,364 | $0 |
| Cleveland | $293,819 | $994,364 | $736,690 | $0 | $1,285,062 | $438,632 |
| Connecticut | $4,061,257 | $4,689,343 | $1,291,352 | $593,672 | $3,349,083 | $0 |
| Gainesville | $1,621,353 | $2,521,460 | $1,169,686 | $584,843 | $787,828 | $0 |
| Gulf Coast | $3,712,202 | $4,189,151 | $1,364,883 | $2,562,807 | $964,240 | $0 |
| Hampton Roads | $7,301,806 | $5,431,926 | $4,093,900 | $2,337,128 | $7,784,983 | $48,790 |
| Lafayette | $2,250,668 | $2,236,706 | $1,301,329 | $437,533 | $3,698,056 | $292,421 |
| Las Vegas | $5,195,038 | $1,754,574 | $7,821,262 | $5,668,566 | $13,504,732 | $0 |
| Macon | $1,326,456 | $2,046,051 | $682,317 | $438,207 | $1,270,073 | $0 |
| New Orleans | $1,053,049 | $5,443,877 | $1,754,528 | $877,264 | $2,216,497 | $0 |
| Northern Virginia | $6,974,368 | $4,776,216 | $4,776,216 | $2,388,108 | $884,158 | $0 |
| Oklahoma City | $7,945,394 | $5,109,368 | $1,878,543 | $1,364,633 | $4,629,821 | $1,462,107 |
| Omaha | $4,018,772 | $3,809,734 | $3,103,300 | $77,520 | $6,046,532 | $0 |
| Orange County | $871,514 | $8,014,233 | $3,116,866 | $1,364,633 | $3,480,890 | $0 |
| Palos Verdes | $286,819 | $839,324 | $503,880 | $0 | $1,108,462 | $0 |
| Phoenix | $17,096,545 | $4,884,751 | $7,812,222 | $5,018,397 | $11,742,886 | $48,790 |
| Rhode Island | $7,132,748 | $3,014,886 | $1,753,684 | $2,040,879 | $7,767,339 | $1,852,055 |
| Roanoke | $659,780 | $388,470 | $292,421 | $146,211 | $96,799 | $0 |
| San Diego | $5,132,363 | $4,412,858 | $3,970,291 | $2,168,336 | $5,825,012 | $0 |
| Santa Barbara | $766,423 | $1,317,126 | $891,480 | $0 | $1,714,556 | $0 |
| Sun Valley | $300,350 | $361,522 | $193,800 | $0 | $402,014 | $0 |
| Tulsa | $10,071,994 | $9,321,439 | $3,034,756 | $1,129,778 | $3,723,649 | $0 |
| Tucson | $2,762,286 | $633,580 | $1,267,159 | $729,879 | $338,437 | $0 |
| Wichita | $6,050,191 | $5,901,346 | $4,420,890 | $77,770 | $11,167,572 | $0 |
| TOTAL ANNUAL CAPEX | $102,616,641 | $89,432,269 | $61,019,663 | $31,163,124 | $101,275,569 | $4,142,796 |
| CUMULATIVE CAPEX | $389,650,062 | | | | | |
| EON TOTAL ADJUSTED CAPEX BUDGET | $35,700,637 | $50,219,070 | $35,464,280 | $0 | $0 | $0 |
| Variance to TOTAL BUDGET | $66,916,004 | $39,213,199 | $25,555,383 | $31,163,124 | $101,275,569 | $4,142,796 |
| Cumulative | $66,916,004 | $106,129,203 | $131,684,587 | $162,847,711 | $264,123,280 | $268,266,076 |
| 2008 JAN-JUN YTD SPEND (All Mkts) | $56,355,189 | | | | | |

FIG. 46

| Network Capex Summary | 2008 | 2009 | 2010 | 2011 | 2012 | 2013 |
|---|---|---|---|---|---|---|
| CMTS / Node Split CAPEX | | | | | | |
| CMTS | $21,008,141 | $9,481,753 | $3,277,519 | $3,949,030 | $14,436,510 | $0 |
| Node Split | $37,685,682 | $7,272,410 | $3,188,940 | $9,382,138 | $59,990,133 | $80,000 |
| Node Decombine | $526,500 | $18,250 | $41,250 | $36,250 | $127,250 | $0 |
| Line Cards | $40,021,750 | $6,318,250 | $81,550 | $2,446,500 | $17,941,000 | $0 |
| RF GW 10 | $0 | $13,875,200 | $0 | $216,800 | $22,980,800 | $0 |
| NSG9000 EDGE QAM | $16,434,000 | $3,403,000 | $83,000 | $249,000 | $3,780,450 | $124,500 |
| 3G60 CARD | $0 | $0 | $0 | $0 | $0 | $0 |
| SPA CARDS | $13,845,970 | $31,961,805 | $29,598,870 | $17,452,555 | $11,690,310 | $3,399,310 |
| TX-32 CARDS | $3,333,000 | $12,771,000 | $1,650,000 | $891,000 | $3,432,000 | $0 |
| RX-32 CARDS | $0 | $0 | $17,754,000 | $891,000 | $3,432,000 | $0 |
| MDE-48 CARDS | $0 | $0 | $0 | $0 | $0 | $0 |
| MDE-240 CARDS | $5,748,378 | $5,353,300 | $3,828,994 | $1,730,788 | $10,956,000 | $0 |
| Sales Tax | $7,185,472 | $6,691,626 | $4,786,242 | $2,163,486 | $5,843,485 | $275,105 |
| Shipping & Handling | | | | | $7,304,356 | $343,881 |
| Total | $145,788,893 | $97,146,594 | $64,290,365 | $39,408,547 | $161,914,294 | $4,222,796 |
| EON CMTS/Node Split Capex Plan of Record | $79,181,683 | $82,385,297 | $59,040,291 | $0 | $0 | $0 |
| Variance to EON CMTS/NS POR | $66,607,210 | $14,761,296 | $5,250,074 | $39,408,547 | $161,914,294 | $4,222,796 |
| Cumulative | $66,607,210 | $81,368,506 | $86,618,580 | $126,027,126 | $287,941,420 | $292,164,216 |

| MARKET EQUIPMENT FORECAST | 2008 | 2009 | 2010 | 2011 | 2012 | 2013 |
|---|---|---|---|---|---|---|
| Network Configuration Changes | | | | | | |
| Node Decombines | 2,106 | 73 | 165 | 145 | 509 | 0 |
| Node Splits | 934 | 162 | 70 | 205 | 1,400 | 2 |
| Equipment Requirements | | | | | | |
| Additional CMTS | 121 | 54 | 19 | 22 | 68 | 0 |
| Additional Line Cards | 949 | 109 | 1 | 30 | 220 | 0 |
| Additional SPA Cards | 334 | 771 | 714 | 421 | 282 | 82 |
| Additional TX-32 Cards | 101 | 387 | 50 | 27 | 104 | 0 |
| Additional RX-32 Cards | 0 | 0 | 538 | 27 | 104 | 0 |
| Additional MDE-48 Cards | 0 | 0 | 0 | 0 | 0 | 0 |
| Additional MDE-240 CARDS | 396 | 82 | 0 | 0 | 264 | 0 |
| Additional NSG9000 EDGE QAM | 0 | 64 | 2 | 6 | 89 | 3 |
| Additional RF GW 10 | 0 | 0 | 0 | 1 | 106 | 0 |
| Additional 3G60 CARD | 0 | 0 | 0 | 0 | 0 | 0 |
| Modem Requirements | | | | | | |
| Additional DOCSIS 2.0 MODEMS | 305,156 | 310,014 | 0 | 0 | 0 | 0 |
| Additional DOCSIS 3.0 MODEMS | 0 | 0 | 3,194,887 | 3,473,597 | 3,479,332 | 3,688,048 |

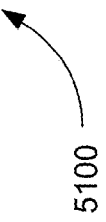

| LONG TERM PLAN | | | | | | | |
|---|---|---|---|---|---|---|---|
| STARTING SUBSCRIBERS | 2007 | 2008 | 2009 | 2010 | 2011 | 2012 | 2013 |
| CHSI Total | 3,347,431 | 3,727,023 | 4,020,097 | 4,254,262 | 4,464,146 | 4,704,961 | 4,872,414 |
| GROSS ADDS | 2007 | 2008 | 2009 | 2010 | 2011 | 2012 | 2013 |
| CHSI Total | 1,707,926 | 1,711,694 | 1,720,273 | 1,771,727 | 1,839,711 | 1,879,990 | 1,921,502 |
| MONTHLY CHURN RATE | 2007 | 2008 | 2009 | 2010 | 2011 | 2012 | 2013 |
| CHSI Blended Average | 3.13% | 3.05% | 2.99% | 2.99% | 2.99% | 2.98% | 2.99% |
| DEACTIVATIONS | 2007 | 2008 | 2009 | 2010 | 2011 | 2012 | 2013 |
| CHSI Total | 1,328,334 | 1,418,663 | 1,486,108 | 1,561,843 | 1,646,996 | 1,712,537 | 1,780,808 |
| ENDING SUBSCRIBERS | 2007 | 2008 | 2009 | 2010 | 2011 | 2012 | 2013 |
| CHSI Total | 3,727,023 | 4,020,097 | 4,254,262 | 4,464,146 | 4,704,961 | 4,872,414 | 5,046,208 |
| AVERAGE SUBSCRIBERS | 2007 | 2008 | 2009 | 2010 | 2011 | 2012 | 2013 |
| CHSI Total | 3,537,227 | 3,873,560 | 4,137,180 | 4,359,204 | 4,584,553 | 4,788,687 | 4,959,311 |

CAPACITY PLANNING USING USER-LEVEL DATA AND UPWARD PROJECTIONS

FIELD OF THE INVENTION

This disclosure relates in general to modeling telecommunications networks, and more particularly to using data collected from the user level to project upwards to model a telecommunications network.

BACKGROUND

Capacity planning involves the identification of hardware and software configurations that are best suited to meet the needs of a telecommunications network. Capacity planning requires an understanding of service levels, resource usage, etc. to align capacity requirements with business demands. One of the major goals of capacity planning is to ensure that the business service-level objectives are met. However, multiple services are competing for the same forward and return path spectrum. Thus, in today's competitive environment, network quality and performance reliability are as important as the breadth of services offered.

A data model representing the telecommunications network is often used in management and capacity planning. System planners use a variety of analytical tools, formulas and techniques to implement a capacity planning methodology. For example, some of the issues involved in capacity planning include defining capacity areas, capacity variables and performance models. Models are used to ensure planning decisions are based on sound information. These models are calibrated and validated to ensure that the models accurately reflect the actual operation of the system. Identifying the relationship between Business Metrics of Interest (BMIs) and available system performance metrics is critical to accurate models and forecasts. BMIs represent the real world transactions that drive a business workload's resource consumption. System planners and network managers base their decisions on the analysis of the model in an attempt to optimized network configurations and plan network evolution.

However, there are often competing interests in determining what capacity plan modifications to implement. A difficult, but important, component associated with capacity planning for cable, Internet and other communications companies is determining how much bandwidth is needed. Typically there are three curves involved in determining how much capacity is needed on a given network.

The demand curve is almost an asymptotic curve. However, a point may be reached the demand curve goes to infinity. The retail curve focuses on the product being sold to the users in terms of the growth of the service being provided and is generally linear. Somewhere between the retail and demand curve is the user experience curve that illustrates a measure of the user experience. The user experience curve defines, at any point in time, how much capacity is available to keep customers satisfied. The closer capacity approaches the demand line, the better bandwidth is provided to the user. The closer you get to the retail line, the less expensive the service is, but leaves customers feeling less satisfied about the experience.

Previously methods for planning capacity requirements focus on access devices and determining how much bandwidth a group of users are consuming. Projections are made regarding how much bandwidth is the group of users looking for to satisfy their downstream consumption and how much bandwidth are users looking for to meet upstream consumption needs.

However, these methods are characterized as a top-down view of capacity planning. Necessarily, top-down capacity planning relies on a very macro level. Thus, the fine grain details that are unique to demographics, to age groups, etc. are missed.

SUMMARY OF THE INVENTION

To overcome the limitations described above, and to overcome other limitations that will become apparent upon reading and understanding the present specification, embodiments for predicting network capacity requirements and assigning hardware resources to meet those requirements are disclosed.

Rather than take such a top down view of the network capacity world, embodiments described herein reconstruct a bottom up view. Data is collected on users, demographic parameters, speed tiers, application mixes, etc. This data then may be used to reconstruct the consumption down at the user level. From this, bandwidth capacity planning is projected upwards.

An embodiment includes a method for planning capacity requirements of a telecommunications network. The method includes collecting data at the user-level associated with provisioning of telecommunication services over a telecommunications network, storing the collected user-level data in a database, modeling a network by generating upward projections from the stored user-level data and transforming the modeling of the network to a visual display of capacity information and network parameters for manipulation to evaluate capacity planning scenarios.

In another embodiment, a computer readable medium is provided. The computer readable medium includes executable instructions which, when executed by a processor, provides capacity planning associated with a telecommunications network by collecting data at the user-level associated with provisioning of telecommunication services over a telecommunications network, storing the collected user-level data in a database, modeling a network by generating upward projections from the stored user-level data and transforming the modeling of the network to a visual display of capacity information and network parameters for manipulation to evaluate capacity planning scenarios.

In another embodiment, a telecommunications network capacity planning system is provided. The system includes a telecommunications network including a telecommunications services provider, subscribers and a network coupling the telecommunications services provider and the subscribers for provisioning of the telecommunications services. A database system is used for collecting and storing data at the user-level associated with provisioning of telecommunication services over the telecommunications network. A processor is coupled to the database system. The processor models the telecommunications network by generating upward projections from the stored user-level data and transforms the modeling of the network to a visual display of capacity information and network parameters for manipulation to evaluate capacity planning scenarios.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout:

FIG. 1 illustrates an embodiment of one format for the nodes combining plan (NCP) data;

FIG. 2 is a screen shot showing the sub-count data according to an embodiment of the invention;

FIG. 3 is a screen shot showing the household user data according to an embodiment of the invention;

FIG. 4 is a screen shot showing the utilization data according to an embodiment of the invention;

FIG. 7 is a screen shot showing a directory structure according to an embodiment of the invention;

FIG. 8 shows a completed NCP file according to an embodiment of the invention;

FIG. 9 highlights the fields which must be set according to an embodiment of the invention;

FIG. 10 illustrates a screen shot of the Master CMTS data according to an embodiment of the invention;

FIG. 17 shows the setting of market competitive strategy flags according to an embodiment of the invention;

FIG. 18 shows the number of lines card slots per chassis that must be set in the specific market input sheet under the ABC equipment configuration section;

FIG. 19 illustrates the correct migration setting for the ABC migration according to an embodiment of the invention;

FIG. 22 is a screenshot showing cable modem throughput data entries according to an embodiment of the invention;

FIG. 23 illustrates the setting for a market with Cap and Grow enabled beginning in 2008 according to an embodiment of the invention;

FIG. 24 shows a table containing the configuration inputs for EQAM devices according to an embodiment of the invention;

FIG. 25 is an interface for specifying line cards per CMTS Chassis according to an embodiment of the invention;

FIG. 26 is an interface for specifying migration options according to an embodiment of the invention;

FIG. 27 shows a set of XYZ migration specifications/inputs according to an embodiment of the invention;

FIG. 28 shows the migration options;

FIG. 30 is a prompt dialog that is activated when the Projector Model is paused according to an embodiment of the invention;

FIG. 31 is a worksheet showing the node split equipment cost according to an embodiment of the invention;

FIG. 32 is a worksheet showing the node split installation cost according to an embodiment of the invention;

FIG. 33 illustrates the node decombine equipment cost according to an embodiment of the invention;

FIG. 34 illustrates the node decombine installation cost according to an embodiment of the invention;

FIG. 35 illustrates the interface for updating sales tax according to an embodiment of the invention;

FIG. 36 illustrates the interface for disabling the sales tax according to an embodiment of the invention;

FIG. 37 is an interface for updating shipping and handling cost according to an embodiment of the invention;

FIG. 38 shows the disabling of shipping and handling cost according to an embodiment of the invention;

FIG. 41 shows a network share table according to an embodiment of the invention;

FIG. 42 illustrates the capital expenditure by year and by major category according to an embodiment of the invention;

FIG. 43 illustrates the capital expenditure and budget variance by year and by major category according to an embodiment of the invention;

FIG. 44 shows the total capital expenditure by market according to an embodiment of the invention;

FIG. 45 shows the node split expenditure by market according to an embodiment of the invention;

FIG. 46 shows the CMTS capital expenditure by market according to an embodiment of the invention;

FIG. 47 shows the network capital expenditure summary according to an embodiment of the invention;

FIG. 51 shows a report for equipment forecasts according to an embodiment of the invention;

FIG. 52 is a report on long range planning projections or managing the overall system according to an embodiment of the invention;

DETAILED DESCRIPTION

Figure 5:
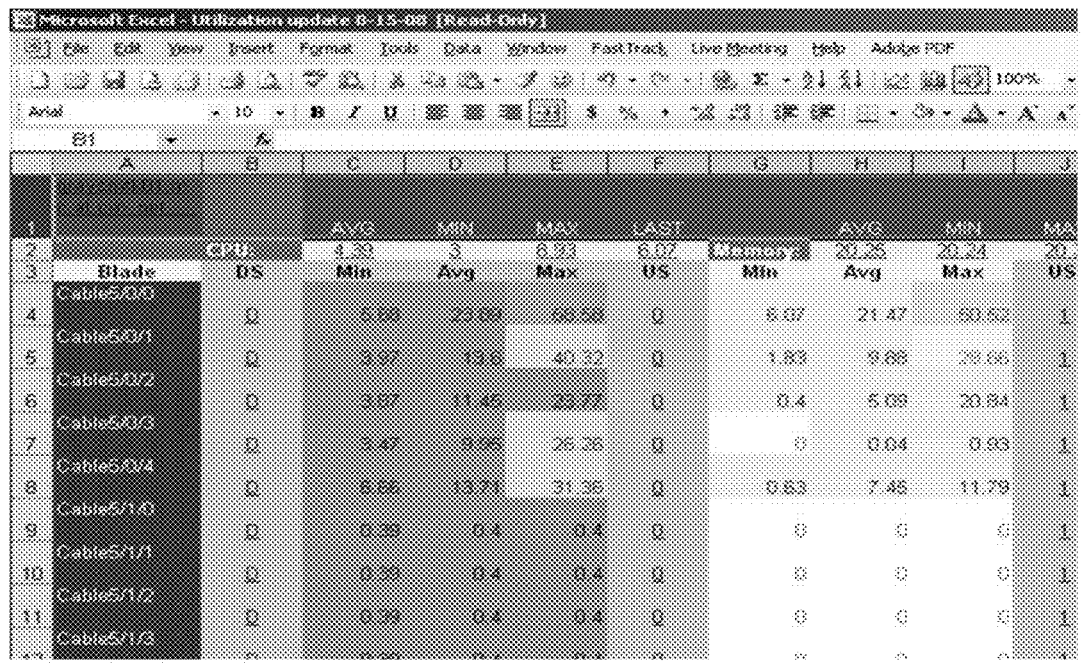
FIG. 5 is a screen shot showing the utilization data presented in the proper format according to an embodiment of the invention.

Embodiments of the present invention are directed to using data collected from the user level to project upwards to model a telecommunications network.

Rather than take such a top down view of the network capacity world, embodiments described herein reconstruct a bottom up view. Data is collected at the user-level. The user-level data may include subscriber data, demographic parameters, speed tiers, and application mixes, etc. This data then may be used to reconstruct the consumption down at the user level. From this, bandwidth capacity planning is projected upwards. For example, how much bandwidth each individual user would consume is gathered and then a model is built to move upwards and determine how much capacity is needed for a particular fiber node. Capacity for a group of fiber nodes, e.g., a service group, is determined using the data associated with particular fiber nodes. This process then continues up to an interface on an access device, a particular access device, and thereon through to the network. Accordingly, a determination of how much actual bandwidth consumption is subscribers using, whether on an application basis, on a group, on granular basis such as protocols or even on a fiber cable.

Once these calculations have been made, by looking back at hysteresis and going backwards in time and then projecting forward, the compound annual growth rate may be determined. The compound annual growth rate may be used to make projections based on what is currently known. This model may be applied to the application usage, to the overall usage, to whatever specific portion of that consumption is of interest. By pushing this analysis forward, projections may be made further out in time what the actual demand will be so that the plant is not overbuilt unless so desired. If overbuilding the plant is desired, the model allows planners to move the end of the line more towards the consumption side, i.e., the demand curve.

Planners may also decide to move the line more towards the retail curve so that an understanding of what that impact of such a move would be on user experience, e.g., what will be the impact on the number of customer trouble tickets that are generated. Moreover, actually knowledge of vendor hardware may be used to assign hardware and cause actions to occur accordingly, e.g., node splits, etc.

FIG. 1 illustrates an embodiment of one format for the nodes combining plan (NCP) data 100. Multiple strands of fiber are provided to a node, e.g., typically in a Dense Wave Division Multiplexing (DWDM) or Coarse Wave Division Multiplexing (CWDM) type configuration which uses multiple local area networks (LANS) such as one for voice, one for data, one for video, etc. The nodes feed back to the head end. The head end feeds to various pieces of access equipment. One such type of access equipment may be a cable node termination system (CNTS). The logic herein works the same regardless of the type of network. The nodes combining plan (NCP) will provide the fiber node name, etc.

The NCP parsing process includes three steps. The first step combines the NCP data with the utilization, sub-count and HHP information. The second step augments this information with equipment configuration flags. The equipment configuration flags provide information on the number and source of channels available to the different service groups. The third step incorporates this parsed and processed NCP to provide a capacity projection.

During the first step, data is stored in a storage device in a predetermined format. The table shown in FIG. 1 includes Market Name, Node Name, CMTS Device Name, Slot/Card, Downstream Port, and Upstream port information to describe the current network topology. In FIG. 1, the market shown is Lafayette, La. The fiber node name is LC007, which may be shown a node map thereby identifying the particular service area, what street, how many houses, etc. The CNTS includes a card that communicates with the downstream and upstream ports.

The data is load into this is the actual utilization for the fiber nodes. Various parameters are monitored, e.g., how much bandwidth users are consuming, how much upstream and downstream bandwidth is being consumed, etc.

The NCP file may not contain any NULL rows; NULL rows are those that have no node names associated with them. The NCP file may also be sorted according to device name, slot/card#, DS port and upstream port.

FIG. 2 is a screen shot showing the sub-count data 200 according to an embodiment of the invention. In FIG. 2, the sub-count data is shown available in two columns. Column A contains the node name and Column B the sub-count. The number of actual subscribers on each physical node may then be determined.

Figures 3, 4:
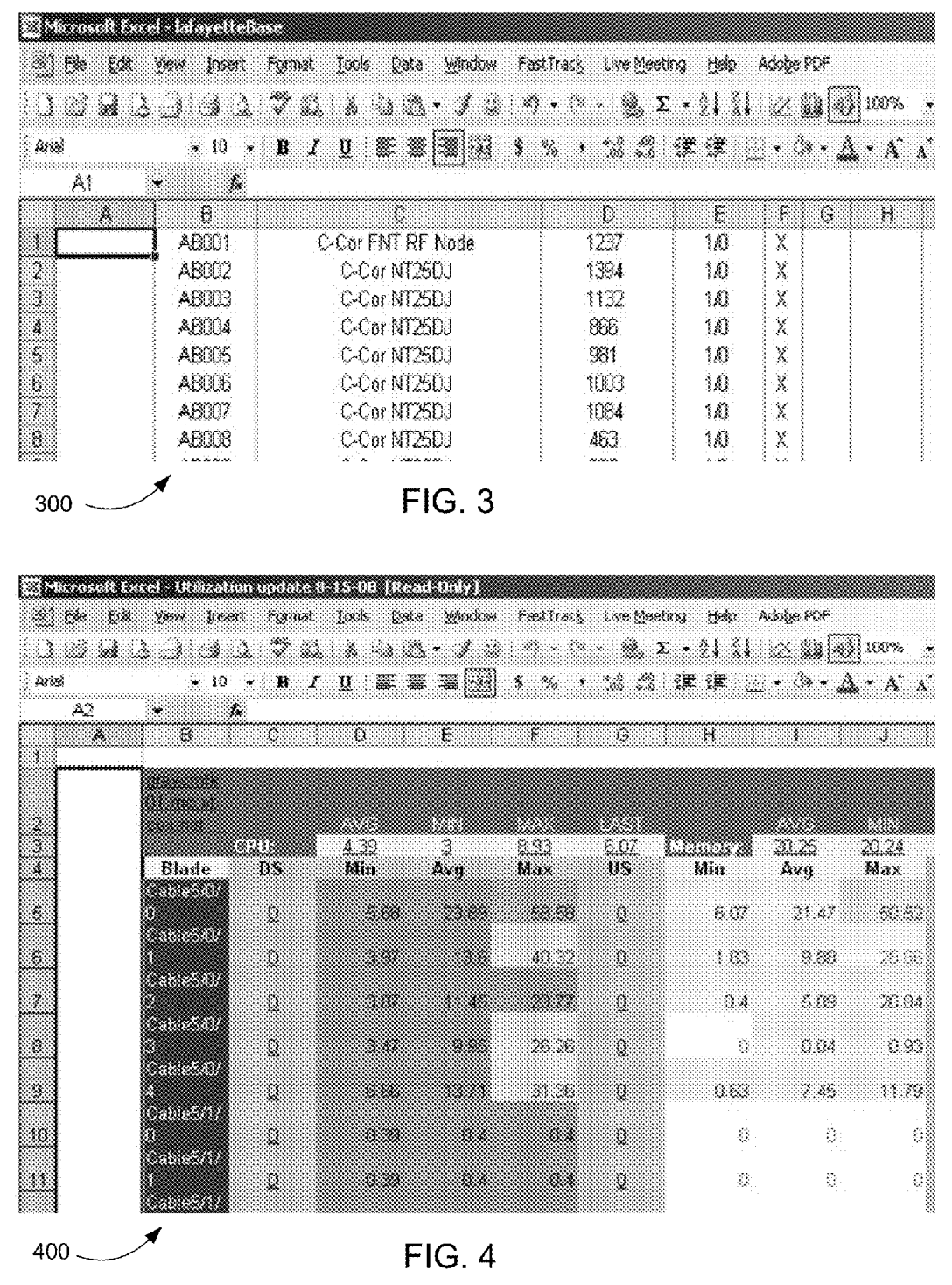

FIG. 3 is a screen shot 300 showing the household user data according to an embodiment of the invention. In FIG. 3, the households passed (HHP) data is provided with the node-name in column B and the HHP count in column D.

Next, FIG. 4 is a screen shot 400 showing the utilization data according to an embodiment of the invention. In FIG. 4, the utilization data is pulled from other sources, e.g., other tools. The utilization data is presented in a predetermined format, wherein the data is entered first in column A, i.e., Column A should not be blank. FIG. 4 shows a blank column A which will cause the parser to fail.

FIG. 5 is a screen shot 500 showing the utilization data presented in the proper format according to an embodiment of the invention. Once all of the data has been loaded, the data is parsed using parser modules. The importing of the parser modules will be discussed below.

Once all the required data is available, a base file for each market needs to be created. The base file aggregates the utilization, sub-count and HHP data into one area, e.g., a workbook. The base file may be created by first creating a new spreadsheet and name it using the naming format "Market-Name_base.xls," e.g., "Tucson_Base.xls." The HHP data is copied into a new area in the base file and it is named "HHP." The sub-count data is copied into a new area in the base file and named the "sub-count." The 10-day and 12-hour utilization data is copied into their own areas.

Figure 6:
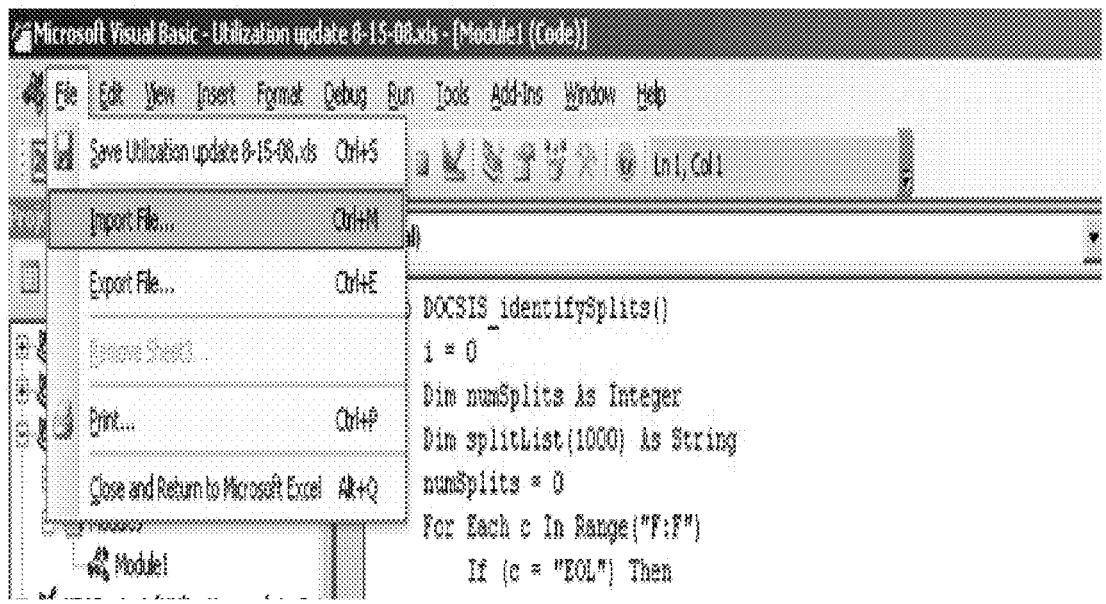
FIG. 6 illustrates the importation of the parser modules according to an embodiment of the invention.

FIG. 6 illustrates the importation of the parser modules 600 according to an embodiment of the invention. The parser code is imported into the areas by engaging the Visual Basic (VB) editor, navigating from Go to File to Import File as shown in FIG. 6. The module files are selected and "Open" is selected. The user returns to the base file and selects the 10-day utilization tab. The user goes to the VB Editor and selects Module 2 from the selection pane on the left. The user then goes to the "read_utilization" function and runs the parser code of Module 1 using the toolbar. The user returns to the base file, selects the 12-hour utilization tab, and repeats the previous steps. Two new worksheets are generated. The two new worksheets are names such that the naming ends in "-PROCESSED." These worksheets contain the processed utilization data. The original data is deleted and the new sheets are renamed to "10 day" and "12 hr" respectively. At this point, 4 tabs are available: HHP, Sub-count, 10 day and 12 hr in your base file. The base file is now ready. The user saves the file. Depending upon the market, additional or fewer steps may be necessary.

The NCP data for each market may be spread over multiple excel workbooks or contained within a single workbook. However, each workbook/file may only have one tab with NCP data. It is recommended that all the NCP be data be combined into one NCP file to save processing steps and time.

To prepare the NCP file, the following steps are executed. For each NCP file, if the data is spread over multiple worksheets, the NCP data is consolidated into one worksheet. All the other sheets are deleted and the lone sheet in the file(s) is renamed to "DOCSIS" The files are saved and closed.

The parser requires a predetermined directory structure. To setup the directory structure, a directory for each market is created. The base file for the market, created earlier as described above, is placed in this directory. A folder named "ncp" is created in the same directory and all the NCP files processed earlier are copied into the "ncp" directory.

FIG. 7 is a screen shot 700 showing a directory structure according to an embodiment of the invention. In FIG. 7, Orange County, for example, is shown. The base file is in the market directory and the NCP files are in the "ncp" directory.

The parser is now ready to process the NCP. The parser is executed by opening the base file and launching the VB editor. Module 2 is selected and the user navigates to the "Main" function. The code is run, for example, by selecting a command from the toolbar. The parser will run for several seconds and then stop. The NCP files will be augmented with all the worksheets from the base file and also include two new worksheets named "DOCSIS-DS-Processed" and "DOCSIS-US-Processed." The former worksheet contains all the downstream information whereas the latter worksheet contains the upstream information.

To complete the first step of the NCP parsing process, the user completes the post processing. Here, the user should verify that there are no errors in both the upstream and the downstream processed tabs. If there are any errors in the sub-count, utilization or HHP columns, the values may be replaced with average values for the market. This process will have to be performed manually. Column D still needs to be populated for both the downstream and upstream worksheets. The user may select the downstream worksheet, launch the VB editor and select Module 1. Then the user may navigate to the "Calc_Subs_2" function wherein the function may be run by selecting the "Play" button from the toolbar. The upstream worksheets may be modified similarly.

FIG. 8 shows a completed NCP file 800 according to an embodiment of the invention. The NCP file shown in FIG. 8 is used as the starting point for figuring out how large future bandwidth consumption will be. A service group is a combination of the node name and the cable downstream. This information allows the number of subscribers to be determined. For example, CH0CHR1CNPT01 indicates the make and manufacturer of the CNTS, where it is in Oklahoma, the number of subscribers, i.e., 583 subscribers. Then there are 7 fiber nodes associated with that downstream. This allows a determination of the number of subscribers per fiber node, how many households passed for each of those fiber nodes, their average utilization and the peak utilization to be made. By using these numbers, projections looking forward may be made.

For example, when average utilization hits is 50% and peak utilization is 80%, the projections may be reviewed to determine that customers are going to have a bad experience and action needs to be taken. Thus, rather than waiting for the customer to have a bad experience, predictions that look in the future allow action to be made ahead within a predetermined time window. An action on that node may not need to be taken today; however, the model may indicate that an action may have to be taken next year. This allows surgical actions to be used to manage the business.

Next, the set-up of the equipment is described. The second half of the database provides information regarding the actual physical hardware that is currently implemented. Equipment configuration flags need to be set in the Master Data DS and Master Data US sheets. The equipment configuration flags indicate the number of channels assigned to a particular service group, as well as the source of the channels (e.g. 5×20 vs. EQAM). Since every service group requires its own set of flags, the intention is that flag setting will be an automated process once a DOCSIS 3.0 NCP format is finalized.

FIG. 9 is a table 900 that highlights the fields which must be set according to an embodiment of the invention. Every service group requires a single set of flags. If there are multiple nodes on the service group, flags for Columns K-W should be set for just the first node listed in that service group. Column X (Node Profiles), on the other hand, should be set for every node in a service group. Every node is profiled based on the business subscriber's penetration and usage.

The Primary DS and Primary US fields indicate which channels are being used as the primary downstream and upstream channels. In the context of DOCSIS 2.0, primary channels can only be supplied either by 2×8 line cards, or by 5×20 line cards. If the service group is supplied by a 2×8 line card, both columns should contain the value "0", otherwise, if the service group is supplied by a 5×20 line card, both columns should contain the value "6". Once DOCSIS 3.0 is available, and TX32/RX32 cards become part of the 2×8 line card configuration, wherein primary channels can also be supplied by the TX32 and RX32 cards. In such a case, a value of "2" should be inputted in Primary DS, and "3" in Primary US.

The DOCSIS 2.0 Fields, 2×8 DS, 2×8 US, 5×20 DS, 5×20 US, can only take on a value of "1", "4" or "0". If the service group is supplied by a 2×8 MAC domain, 2×8 DS should contain the value "1", and 2×8 US the value "4". 5×20 DS and 5×20 US should both contain the value "0". If the service group is supplied by a 5×20 MAC domain, 5×20 DS should contain the value "1", and 5×20 US the value "4". 2×8 DS and 2×8 US should both contain the value "0". If the service group is neither interfaced with a 2×8 nor a 5×20 MAC domain, all DOCSIS 2.0 fields should contain the value "0".

The DOCSIS 3.0 Fields, TX32, RX32, MDE240, EQAM, indicate the number of channels supplied to service group from the respective equipment piece. For example, a "3" in the TX32 field, and "2" in the RX32 field, indicates that the service group receives 3 QAMs from a TX32 port, and 2 QAMs from a RX32 port. A value of "0" should be entered if no QAMs are supplied by that particular equipment piece. Note that MDE240 refers specifically to 2×8 modular channels, and EQAM specifically to 5×20 modular channels.

Node Profiles Column indicates the profile for each node, and consequently, the amount of bandwidth that must be reserved for each node. Definitions for each profile are shown in the Node Profiles sheet.

In the first row, number 5 illustrates one of ten different profiles that may be used. Zero is residential only, no business customers. One is a few, two is more. Number five represents a large amount of business customers with a very heavy business demand. And since business customers pay more, a better experience is preferred. The may require bandwidth to be taken off the top to keep business customers happy.

Once the NCPs have been parsed and processed, there remains the final step of incorporating them into the Master Data sheets of the Projector file. If old NCP data already exists in the Projector file for the processed market, a replacement will be required, and is included in the instructions.

If old NCP data for the given market exists in Master Data DS and Master Data US sheets, the user will delete those specific rows entirely. The last row of Master Data DS and Master Data US should read EOL across columns A to Z. The user will delete this row as this indicates the end of the NCP entries. Then, the user will paste the parsed and process downstream NCP data starting where the EOL entries were previously located in Master Data DS. Likewise, the user will paste the parsed and processed upstream NCP into Master Data US. As a check the total number of row entries in Master Data DS and Master Data US should be exactly equal.

In the row immediately after the last entry in Master Data DS and Master Data US, the user will insert the entry EOL in columns A-Z.

FIG. 10 illustrates a screen shot 1000 of the Master CMTS data according to an embodiment of the invention. Referring to the Master CMTS Data of FIG. 10, all the CMTS' in each market should be listed. If CMTS entries already exist for the market being incorporated, these rows should be deleted entirely.

Figure 11:
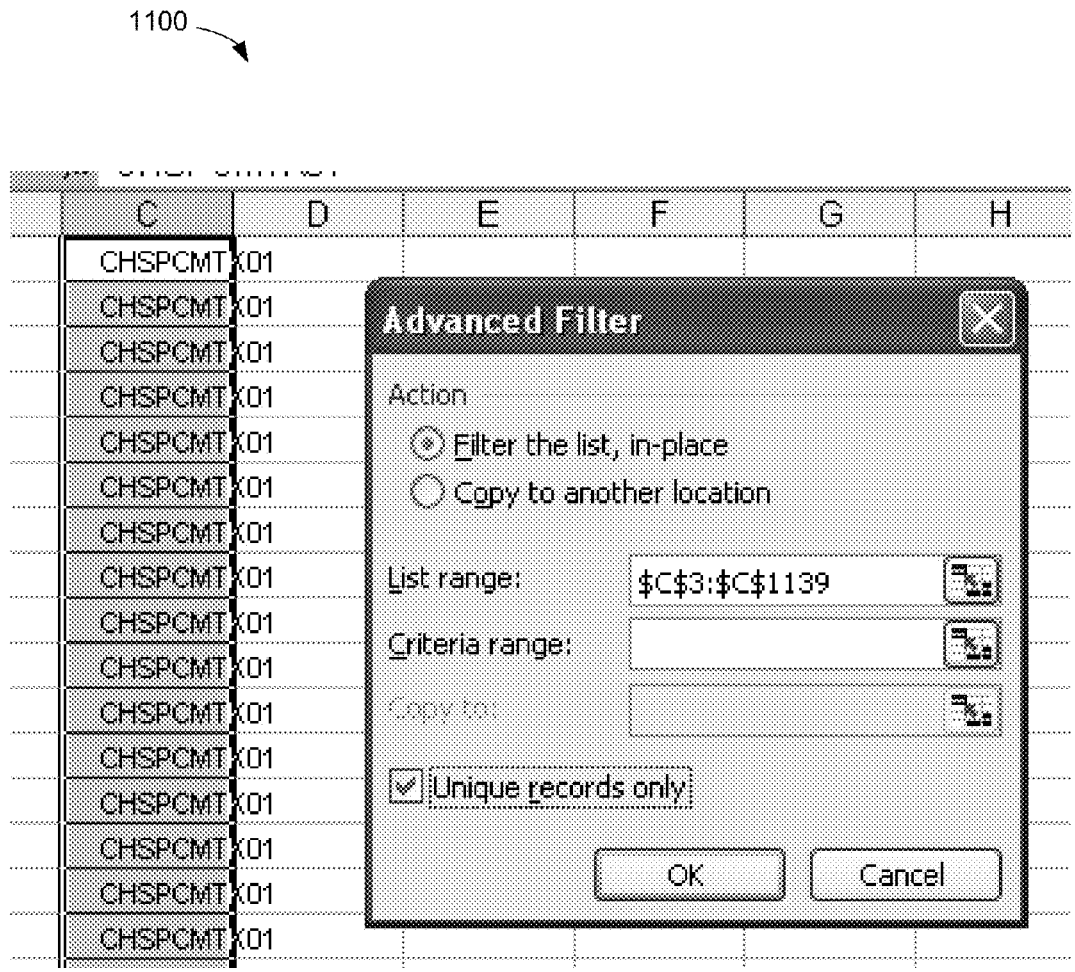
FIG. 11 shows the filtering of a CMTS list to obtain the unique CMTS names.

The last row of Master CMTS Data should read EOL across columns A to E. The user will delete this row because this indicates the end of the CMTS data. Referring to the newly pasted NCP data in Master Data DS, all Column C items for this market are copied. This includes all CMTS names for the market. The copied items are pasted into a new workbook. The CMTS list 1100 may be filtered to obtain the unique CMTS names as shown in FIG. 11.

A list of unique entries should now be created. The user will check that the first entry is not repeated twice. The user copies all unique entries created and paste them into Column A starting where the EOL row was previously located. For each newly pasted entry in Column A, the user will enter the market name in Column E. Correct spelling of the market name is critical. On the row immediately after the last entry, the user enters EOL in columns A to E to indicate the end of the CMTS list. The model is now ready to be run with updated NCP data thereby allowing user to quickly analyze different scenarios. Below, several typical scenarios will be described.

Figure 12:
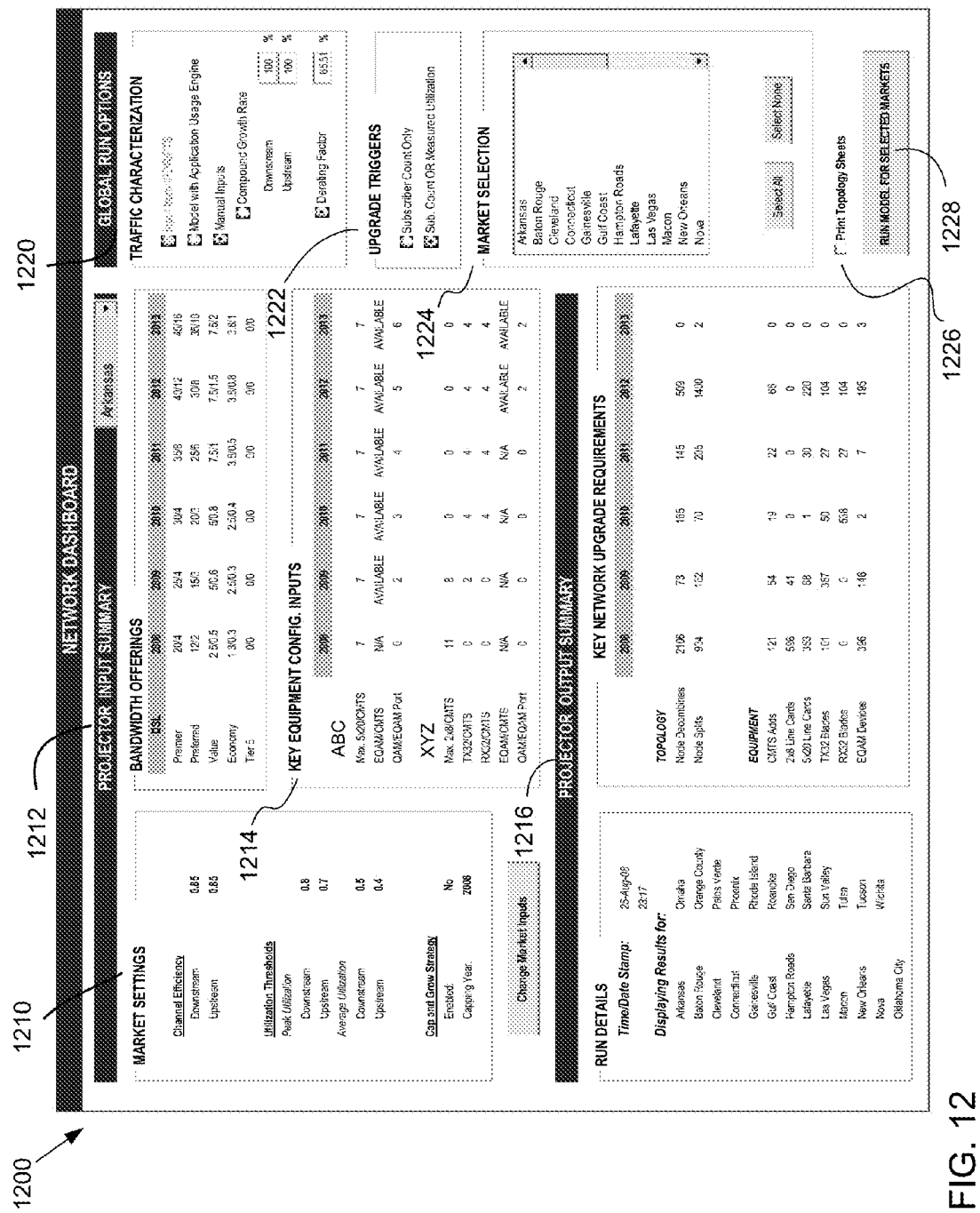
FIG. 12 is a screenshot of the network dashboard according to an embodiment of the invention.

FIG. 12 is a screenshot of the network dashboard 1200 according to an embodiment of the invention. The primary network dashboard screen 1200 is used to simplify the data. On the left, settings unique to certain markets are indicated. The screens provide the ability to show the proficiency for any given market, i.e., how much of the downstream paths and upstream paths based on the current configuration are available for customer use, what the thresholds are. For example, for 80% of the downstream paths, 50% of the downstream, 80% peak, 50% average, 70% upstream peak, 40% upstream average, the action that needs to be taken may be projected. Thus, for 80% peak, 50% average and 50% average, a predetermined activity is triggered and a sequence of decision points is traversed once the predetermined activity is triggered.

More specifically, if there are two fiber nodes and one of those fiber nodes is going to exceed bandwidth capacity and cause a bad customer experience, the two nodes are split apart and additional hardware is added only by points to service the new demand so that extra hardware is not just sitting around.

In FIG. 12, the dashboard includes an interface showing market settings 1210, bandwidth offerings 1212 and key equipment configuration inputs 1214. Another interface 1216 is provided showing a summary of the projector output. On the right side of FIG. 12, an interface 1220 is provided for selecting traffic characterization. An interface 1222 is also provided for upgrading trigger selections that cause an event to happen based on the number of subscribers that are predicted to be in that fiber node or that can be supported. Markets that are to be included in the run may be selected using a market selection interface 1224. NCP projector outputs may be selected for printing 1226. Also, a selection is provided for executing NCP projections and printing 1228.

Also, the network includes devices called HQAMs, and in these HQAMs a single cable is coming out. The block upconverter stores downstream data coming out of that single port contiguously, e.g., channels 2, 3, 4 and 5. However, only channel 2 may currently be in use. Therefore, if an additional downstream path is needed, if one is available and there is frequency available, another downstream path may be implemented so additional capital expense would not be required. However, if another downstream path is not able to be implemented or additional frequency is not available, and then channels would be combined in a node if the node has the capability. If the node could not be de-combined because there was no additional capacity at that point, a node would have to be split, which means service personnel would have to physically go out, lay cable on the ground or in the air, install new hardware, obtain the initial pole rights, verify the right of way, etc. Obviously, this is a very expensive operation. Thus, these physical operations should be minimized as much as possible. The process for the upstream path is a much simpler scenario because additional modulation is available. More speed may be obtained out of the same channel by increasing the modulation. The bandwidth offering is defined by the strategy and project management group and the equipment configuration is dependent on engineering recommendations and what the equipment that each market may have.

Figure 13:
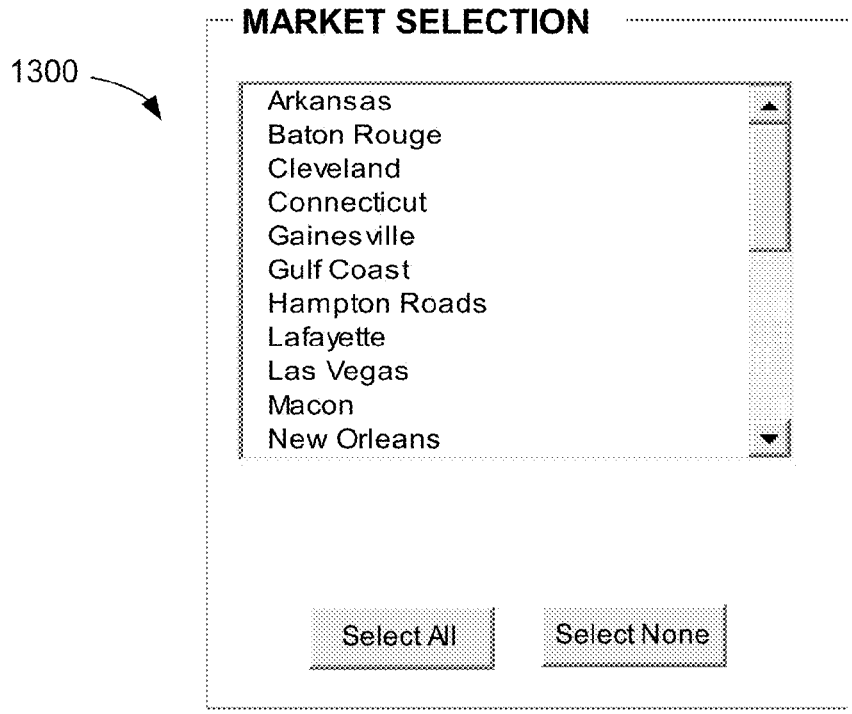
FIG. 13 shows an interface for selecting markets according to an embodiment of the invention.

FIG. 13 shows an interface 1300 for selecting markets according to an embodiment of the invention. The user selects the markets that are to be included in the run from the market selection box. The user selects the capacity upgrade triggering mode in the upgrade triggers box. The key requirements are also listed there. This indicates on a year by year basis how many nodes have to be de-combined, how many splits need to be made, etc.

Figure 14:
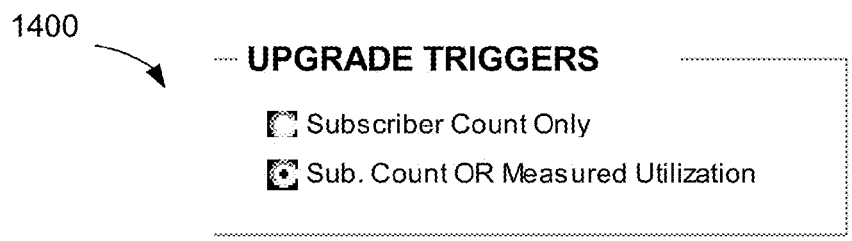
FIG. 14 is an interface for upgrading trigger selections according to an embodiment of the invention.

FIG. 14 is an interface 1400 for upgrading trigger selections according to an embodiment of the invention. Upgrade triggers that cause an event to happen may be based on the number of subscribers that are predicted to be in that fiber node or that can be supported. For example, the "Subscriber Count Only" will only consider subscriber counts on each of the service groups when determining capacity upgrade requirements. The Sub.Count OR Measured Utilization will consider both the subscriber counts and downstream/upstream utilizations on each of the service groups. Measured utilization only applies to the first year while subscriber counts apply to all years.

Figure 15:
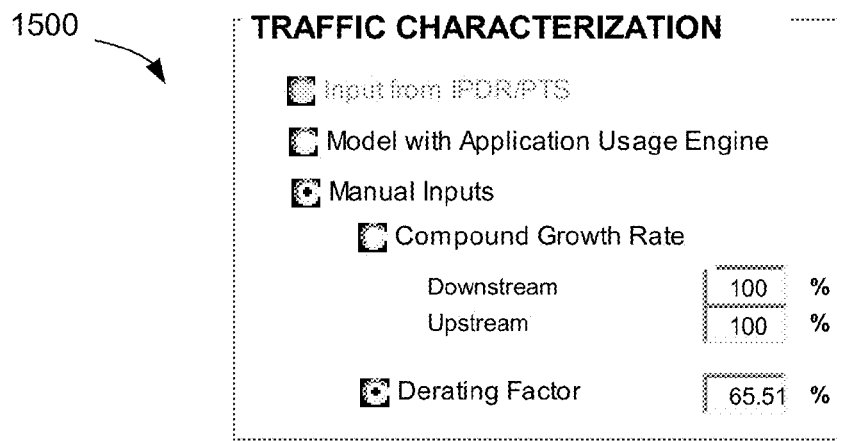
FIG. 15 shows an interface for selecting traffic characterization according to an embodiment of the invention.

FIG. 15 shows an interface 1500 for selecting traffic characterization according to an embodiment of the invention. In the Traffic Characterization box, the user selects the method for projecting cable modem throughputs. For example, modeling may be based on the amount of application being distributed, whether peer to peer traffic, web surfing, file downloading, movies, etc. The "Model with Application Usage Engine" grows cable modem throughput linearly with the growth in application bandwidth requirements, as calculated in the Application Demand tab.

The "Compound Growth Rate" grows cable modem throughput by a set percentage year over year. A separate growth percentage can be specified for DS and US. Modeling may also be based on a compound growth rate. You can set the bandwidth for downstream to 38% and the upstream to 28%. Models may be run for different possible scenarios to identify different results.

Rating factors may also be used.

Figure 16:
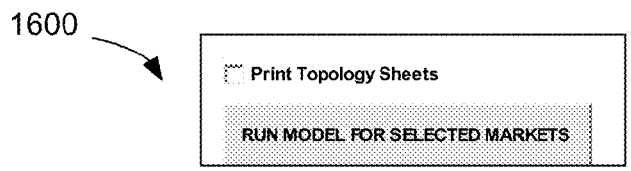
FIG. 16 shows an interface for executing NCP projections and printing NCP projector outputs according to an embodiment of the invention.

The "De-rating Factor" grows cable modem throughput in correlation with the growth in the bandwidth offering for that year. Instead of growing throughputs linearly with bandwidth offerings, a de-rating factor can be specified to de-rate the otherwise linear growth. For example, if a user currently has a de-rating factor and has 10 megabits downstream and typically uses 50 kilobits on average, what happens to the user's consumption when the speed is increased to 20 megabits FIG. 16 shows an interface 1600 for executing NCP projections and printing NCP projector outputs according to an embodiment of the invention. The Print Topology Sheets is selected if projected NCP outputs are required. The Run Model for Selected Markets is selected to run the projector modeling. Once all market input sheets are completed, runs can be performed solely from the Network Dashboard.

FIGS. 17-28 illustrate the execution of a plurality of scenarios according to an embodiment of the invention.

FIG. 17 is a table 1700 showing the setting of market competitive strategy flags according to an embodiment of the invention. For example, changing a market from Fiber to DSL, or vice versa, requires a change in both the Business Dashboard, and the specific market input sheet. The Business Dashboard contains flags for each of the markets specifying whether it is Fiber or DSL. In FIG. 17, a value of "3" is used to specify a market as Fiber or FiOS competitive. Likewise, for DSL markets, a value of "1" is used.

Having appropriately set the flag on the Business Dashboard, the Cable Modem Throughput inputs are adjusted on the specific market input sheet. Throughputs need only be changed for the current year, and should be changed to reflect the bandwidth that is offered in the year for that particular market, e.g., see rows 348-370.

Various groups may have different ways of adding service groups. FIG. 18 is a screenshot 1800 of a first type of CMTS chassis according to an embodiment of the invention. The default configuration for the first type of CMTS chassis allows for a total of 35 service groups per chassis. Reducing to 24 service groups per chassis is accomplished by limiting the number of 5×20 line card slots per chassis. Whereas the default configuration for the first type of CMTS chassis accommodates up to 7 5×20 line cards per chassis (7 line cards×5 service groups/line card=35 service groups/chasses), a 24 service group per chassis can be simulated by limiting the number of line cards to 5 per chassis. The number of lines card slots per chassis must be set in the specific market input sheet under the ABC equipment configuration section shown in the screenshot of FIG. 18. The highlighted row in FIG. 18 illustrates the input that needs to be changed.

Since a market may have already have CMTS chasses with over 24 service groups, a flag must be set under the Migration Options of the ABC CMTS to force a migration to the new configuration. This is achieved by enabling the Migrate to Different CMTS option, and selecting 2×8 DS from both the drop-down fields.

Next, the profile, enabling, disabling, CIR services, etc. are provided in a plan of record. The scenarios may be manipulated and then the utilization per subscriber may be analyzed.

FIG. 19 is a screenshot 1900 illustrates the correct migration setting for the ABC migration according to an embodiment of the invention. Changing the line cards per chassis also requires a change in the number of SPA cards per chassis. With a 24 service group per chassis configuration, a SPA card is required for every QAM per EQAM port. This can be configured within the ABC Equipment Parameters section. Technically, limiting the CMTS to 5 line card slots per chassis creates a 25 service group per chassis configuration.

Figure 20:
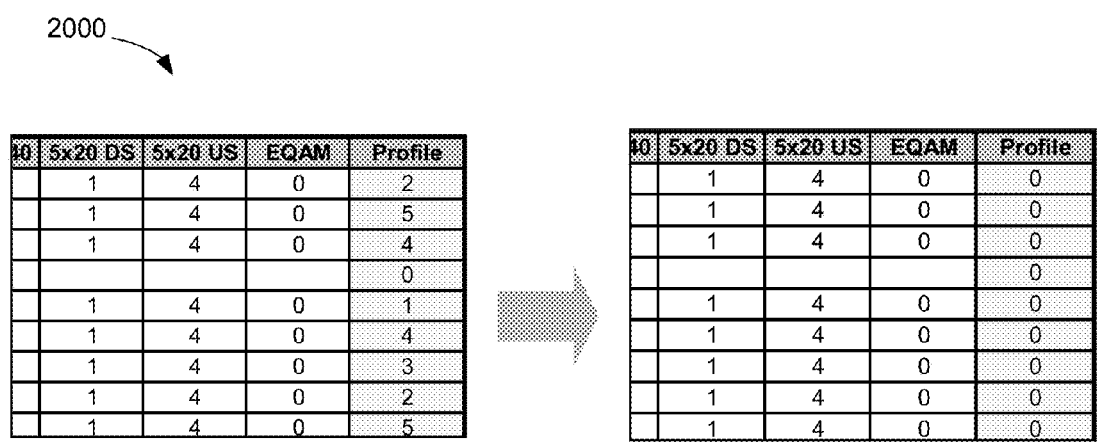
FIG. 20 compares the enabling and disabling cir business services according to an embodiment of the invention.

FIG. 20 is a comparison 2000 of the enabling and disabling cir business services according to an embodiment of the invention. The Projector Model allows a node-by-node specification of the CIR business services available to that node. Definitions of each profile are provided in the Node Profiles worksheet. The default setup assigns a profile of "0" to nodes that do not possess any business CIR services. As such, disabling CIR business services across all nodes requires setting all nodes to Profile 0. This is accomplished by changing every value in Column X ("Profile") of Master Data—DS and Master Data—US to 0. Re-running the model will display results for a scenario in which there are no CIR business services.

Figure 21:
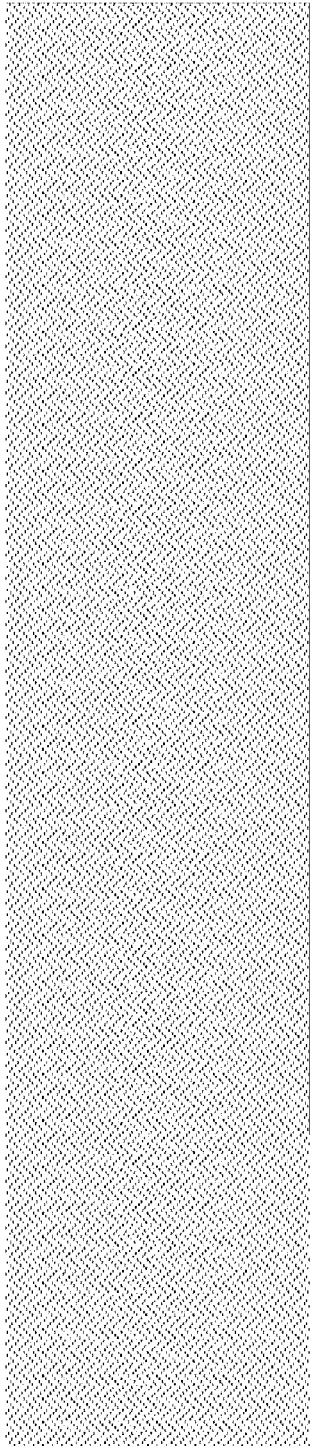
FIG. 21 is a screenshot of a table showing speed inputs that may be changed when switching between EON POR and Retail Scenarios according to an embodiment of the invention.

FIG. 21 is a screenshot 2100 of a table showing speed inputs that may be changed when switching between EON POR and Retail Scenarios according to an embodiment of the invention. The Projector Model can switch between EON POR and Retail scenarios by changing only a few inputs. The key difference between the EON and Retail scenarios is the bandwidth speed offerings—as such, the bandwidth offering must be changed in the Business Dashboard.

In FIG. 21, the tables contain inputs for the Premier, Preferred, Value, Economy and Tier 5 service tiers, and are broken out by downstream and upstream. The first table, labeled Fiber Competitive Strategy, holds the inputs for Fiber markets. Likewise, the last table, labeled DSL Competitive Strategy, contains the inputs for DSL markets. The shaded table in the middle is a placeholder for a third competitive strategy. Changing the bandwidth for a given tier will impact the cable modem throughput to the user. As such, the cable modem throughput inputs must also be updated in Projector. Cable modem throughput inputs are specified on a per market basis in the individual market input sheets under the Utilization Engine Inputs section. Note that throughputs are required for both downstream and upstream for each tier. The inputs are specified for just the first year. Beyond that, throughput growth is correlated with growth in the bandwidth speed offering.

FIG. 22 is a screenshot 2200 showing cable modem throughput data entries according to an embodiment of the invention. The entries in FIG. 22 may be used for enabling and disabling cap and grow. In order to accurately capture market strategies, the Projector Model has the option to cap all XYZ CMTS chasses and increment only ABC CMTS chasses. Despite capping additional XYZ CMTS purchases, all existing XYZ chasses will remain in the topology, and undergo configuration migrations to include TX32, RX32, MDE240 cards, etc. Only at the point where a XYZ chassis is fully populated, will a trigger be enabled to transfer any additional service groups to an ABC chassis. This function is enabled on a market-by-market basis on the specific market input sheet.

FIG. 23 is a table 2300 illustrates the setting for a market with Cap and Grow enabled beginning in 2008 according to an embodiment of the invention. The section beginning on Row 630 of the market input sheet contains both the Cap and Grow toggle, as well as a dropdown to specify the year in which the capping is to be enabled. Note, CMTS capping can only be applied to XYZ CMTS chasses. Based on market feedback, no need for ABC capping functionality was required.

FIG. 24 shows a table 2400 containing the configuration inputs for EQAM devices according to an embodiment of the invention. The Projector Model has the option to choose between two different EQAM devices—the EQAM 1, and EQAM 2. These devices can be used with both ABC and XYZ CMTS chasses.

To enable an EQAM device for an ABC CMTS, the appropriate device must be selected from the dropdown on Cell H520 of the specific market input sheet. The two choices are EQAM 1 and EQAM 2. Once the device is selected, the appropriate fields for the EQAM device must be completed. If EQAM 2 is selected from the drop-down, then only the EQAM 2 inputs are relevant. To add EQAM 2 devices in a particular year, the Availability drop-downs in FIG. 24 must be changed from N/A to Available. Along with this change, the Maximum Channels per EQAM Port must be changed from 0 to the appropriate value. The assumption is that each CMTS port will be augmented with a single EQAM port, receiving up to the specified number of additional QAMs/channels from the EQAM port.

Likewise, if EQAM 1 is selected, only the EQAM 1 inputs in FIG. 24 are relevant. Given the nature of the EQAM 1, its availability is specified numerically on Row 529. A value of 0 specifies that no EQAM 1 devices are available that year. A value of 1 indicates just a single EQAM device per chassis whereas a value of 2 indicates two EQAM devices per CMTS. Since a single EQAM 1 has 18 ports, a single EQAM 1 per CMTS allows for only half of the ABC CMTS ports to receive an augmenting EQAM port. On the other hand, if two EQAM 1 devices per CMTS are selected, all ABC ports will be associated with an EQAM port. As with the EQAM 2 inputs, the Maximum Channels per EQAM Port must also be specified.

FIG. 25 is an interface 2500 for specifying line cards per CMTS Chassis according to an embodiment of the invention. For example, in selecting an EQAM device, the appropriate number of SPA cards per CMTS Chassis must be specified. Row 509 in the specific market input sheet contains the inputs for the SPA cards.

FIG. 26 is an interface 2600 for specifying migration options according to an embodiment of the invention. For example, the ABC Migration options must be appropriately set. If an EQAM device is available in a particular year, Port Addition 1 must be enabled for that year, with Existing Port set to 5×20 DS, and Augmenting Port set to EQAM.

XYZ CMTS chasses have evolved to also support a modular architecture. The EQAM selection steps for XYZ are the same as those outlined for ABC, with the following exceptions. Configurations are set in the XYZ Equipment Parameters section. XYZ CMTS has the concept of MDE240 cards instead of SPA cards. If EQAM devices are available in a particular year, the MDE240 card field should be set to 1 instead of 0. As with ABC, Port Addition 1 must be enabled for years where EQAM devices are available. However, specific to XYZ, Existing Port must be set to TX32, and Augmenting Port must be set to MDE240.

In order to run a DOCSIS 2.0 only scenario, all DOCSIS 3.0 equipment inputs must be zeroed or disabled for all years in the specific market input sheet. This includes the following line items:

SPA Cards per Chassis
Usable TX32 Line Cards per Chassis
Usable RX32 Line Cards per Chassis
Usable MDE240 Cards per Chassis As such, Usable 2×8 Line Cards per Chassis in the XYZ section must remain at 11. In addition, all toggles in the Migration Options must be set to Disabled. The only exception is the case in which there is a migration from 35 to 24 service groups per chassis as described above.

FIG. 27 shows a set of XYZ migration specifications/inputs 2700 according to an embodiment of the invention. Whereas ABC migration options are only used for the two scenarios, as outlined above, XYZ markets require a greater number of migration specifications given the devices' integrated nature.

FIG. 28 shows the migration options 2800 for the XYZ device according to an embodiment of the invention. In FIG. 28, there is no DOCSIS 3.0 available in 2008, and as such there are 11 2×8 available line card slots specified in the inputs, with all other DOCSIS 3.0 items zeroed. In 2009, the number of 2×8 line cards reduces to 8 available to accommodate for 2 TX32 blades able of providing up to 2 channels per port. In moving from 11 to 8 line cards per CMTS, some service groups may need to be transferred to another CMTS. In order to capture this, Migrate to different CMTS in Migration Options must be set to Enabled, with Migrating Port set to 2×8 DS, and only migrate if SG does not contain: set to TX32. With this setting, a service group will not be migrated to another CMTS if it is already coupled with a TX32 port. Since TX32 blades are now available, they can be coupled with the 2×8 ports to provide additional channels and DOCSIS 3.0. This coupling is toggled by setting Port Addition 1 to Enabled, with Existing Port set to 2×8 DS, and Augmenting Port set to TX32.

In 2010, TX32 blades and RX32 blades are increased to 4 of each type per CMTS. With the availability of RX32 blades, TX32 channels can act as primary channels with there being no need for 2×8 channels. As such, the input for Available 2×8 Line Card slots has been zeroed for 2010. All these changes are captured by the five Migration Options specified in 2010. The Options are followed in a sequential manner from top to bottom. As in 2009, Migrate to Different CMTS must be enabled to accommodate for 2×8 ports that may be stranded as a result of the reduction in the available line card slots. Also as in 2009, Port Addition 1 must be enabled to couple TX32 ports with 2×8 ports. Port Addition 2 must also be set enabled, with Existing Port set to TX32, and Augmenting Port set to RX32. This couples the RX32 upstream ports with the TX32 downstream ports. With the availability of RX32's, there is no need for 2×8 ports to act as primaries. To capture this, Primary Port Change must be enabled, with "If contains:" set to RX32, "New Primary" set to TX32, and "Old Primary" set to 2×8 DS. The final step is the removal of the 2×8 ports from the service groups altogether, such that the service groups are interfaced to just TX32 and RX32 ports. This is accomplished by enabling Migrate All Legacies, and setting Migrate From: to 2×8 DS, Migrate to (Downstream): to TX32, and Migrate from (Upstream): to RX32. At this point a complete migration of all service groups to TX32's and RX32's has occurred.

In 2011, none of the migration options apply and are thus all disabled. In 2012, EQAM devices are introduced through the MDE240. These MDE240 ports will augment the existing primary TX32 ports. This is initiated by enabling Port Addition 1, and setting Existing Port to TX32, and Augmenting Port to MDE240. In 2013, EQAM devices are still available and hence, the migration specifications from 2012 are repeated.

The XYZ scenario described above is typical of XYZ markets, and is based on commercial availability of the equipment and software release plans. The scenario depicts an introduction of DOCSIS 3.0 in 2009. Pushing DOCSIS 3.0 forward to 2008 requires only that the migration options and configurations for 2008 be set to those for 2009—the only exception is that there will typically be 1 TX32 per CMTS, with just single channel per TX32 port in 2008.

Figure 29:
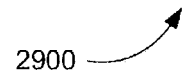
FIG. 29 illustrates an interface for entering the assumptions and key inputs according to an embodiment of the invention.

FIG. 29 illustrates an interface 2900 for entering the assumptions and key inputs according to an embodiment of the invention. In FIG. 29, the year may be started based on the data. The Projector Model has a rolling six year projection window. The Projector Model is thus able to project until then end of 2013 in 2008, to project until the end of 2014 in 2009 and so forth. Updating this start year, and hence the projection window, requires that the Start Year (Cell C9) in the Assumptions and Key Inputs interface to be set to the appropriate start year. In addition, all inputs are updated to reflect the new time window.

For the annual refresh, ALL Projector inputs need to be refreshed as applicable. The following list provides a checklist of items that require a refresh:
  LRP subscriber data (see section 5)
  Financial Inputs including pricing for equipment, node split costs, decombine costs, sales tax and shipping and handling costs (See Section 3)
  Node profile data
  All market-specific inputs on the market input sheets
  Take rates
  Bandwidth and market offering on the business dashboard
  NCP data for the markets
  Budget data The Projector Model also contains modulation order inputs for each of the four upstream ports. Modulation orders are specified on a market-by-market basis—as such, changes to the modulation order inputs occur on the specific market input sheet and are available as drop-down boxes on Rows 421-424.

FIG. 30 is a prompt dialog 3000 that is activated when the Projector Model is paused according to an embodiment of the invention. Since a run may take between 20 to 30 minutes, it may at times be necessary to halt Projector Model in the middle of a run. To manually halt the Projector Model, the user clicks on Excel in the taskbar and press CTRL+Pause. This will pause the Projector Model and initiate the prompt shown in FIG. 30. Pressing Continue will continue the run from this paused state. End, on the other hand, will end the run all together with no option to continue the run afterwards.

The financial data includes information concerning the network costs and configurations. Thus, after the model is run, a projection of how much bandwidth that any fiber node needs is generated. Therefore, the modeling will determine not only the hardware that is necessary to provide a particular level of service, but also the cost of that hardware is projected from the bottom up. Then, sales tax, shipping and handling, installation costs, etc. are accounted for.

All Projector financial inputs are on the NTK CONFIG and COSTS sheet and the Assumptions sheet. Only these two sheets should be changed. The Projector Model defines two major categories of costs: (1) market-independent costs and (2) market-dependent costs. As the names suggest, market-independent costs are uniform across all markets and include costs such as Shipping and Handling Cost, Decombine cost, Sales Tax, and CPE costs. Node Split costs were initially treated as independent costs but can now be customized on a market-level.

To update any cost, the relevant row on the NTK CONFIG and COSTS sheet is located and the cell's value is changed to reflect the correct cost. The key worksheets that constitute the financial engine of the Projector Model include the input sheets and output sheets. For the input sheets, NTK CONFIG and COSTS contains all costs required to forecast the capital expenditure once Projector has output the equipment forecast. Assumptions include start year, active markets for the current Projector run, and EON budget data to drive various results reported by the Projector Module. To update budget numbers, the EON CAPEX BUDGET view section should be updated. This will be described below.

For output sheets, Financial Detail combines the costs form the NTK CONFIG and COSTS sheet as well as the projector equipment forecast to output the total costs on a market level. The Financial Summary rolls-up the costs from the Financial Detail sheet and reports it at higher level. There are several views available on this sheet: Network Capital Expenditure Summary by Equipment, Total Capital Expenditure (Node Split and CMTS), Total Capital Expenditure By Market, Total Node Split Capital Expenditure By Market, Total CMTS Capital Expenditure by Market and the Network Equipment Forecast summary.

FIG. 31 is a worksheet 3100 showing the node split equipment cost according to an embodiment of the invention. Market node split equipment (capital expense) costs can be updated by changing the values on the input table on the NTK CONFIG and COSTS worksheet starting on row 14. Currently, the equipment costs remain the same year over year but this constraint is not enforced by the model.

FIG. 32 is a worksheet 3200 showing the node split installation cost according to an embodiment of the invention. Market node split installation (operating expense) costs can be updated by changing the values in the cost table on the NTK CONFIG and COSTS worksheet starting on row 57. Currently, the installation costs remain the same year over year but this constraint is not enforced by the model.

FIG. 33 illustrates the node decombine equipment cost 3300 according to an embodiment of the invention. FIG. 34 illustrates the node decombine installation cost 3400 according to an embodiment of the invention. The node decombine cost can be changed by updating cells C44 and C87 on the NTK COFIG and COSTS worksheet. C44 reflects the cost of equipment and C87, the cost of installation.

FIG. 35 illustrates the interface 3500 for updating sales tax according to an embodiment of the invention. The sales tax rate can be updated by changing the value on cell C101. FIG. 36 illustrates the interface 3600 for disabling the sales tax according to an embodiment of the invention. Sales Tax can be discounted from the financial calculations by changing the value on cell D101 to '0'. Enabling the sales tax calculation is as simple as changing the value of cell D101 to '1'. A value of '0' will show up as a "No" in the cell whereas a value of '1' will show up as a "Yes."

FIG. 37 is an interface 3700 for updating shipping cost according to an embodiment of the invention. The CMTS and Blade shipping and handling costs can be updated by changing the value on cells C96 and C97.

FIG. 38 shows the disabling of shipping and handling cost 3800 according to an embodiment of the invention. The shipping and handling cost can be disabled and discounted from the financial calculations by changing the values on cells D96 and D97. To disable calculations, change the value of the cells to '0'. To enable the costs, change the value back to '1'. A value of '0' will show up as a "No" in the cell whereas a value of '1' will show up as a "Yes."

Figure 39:
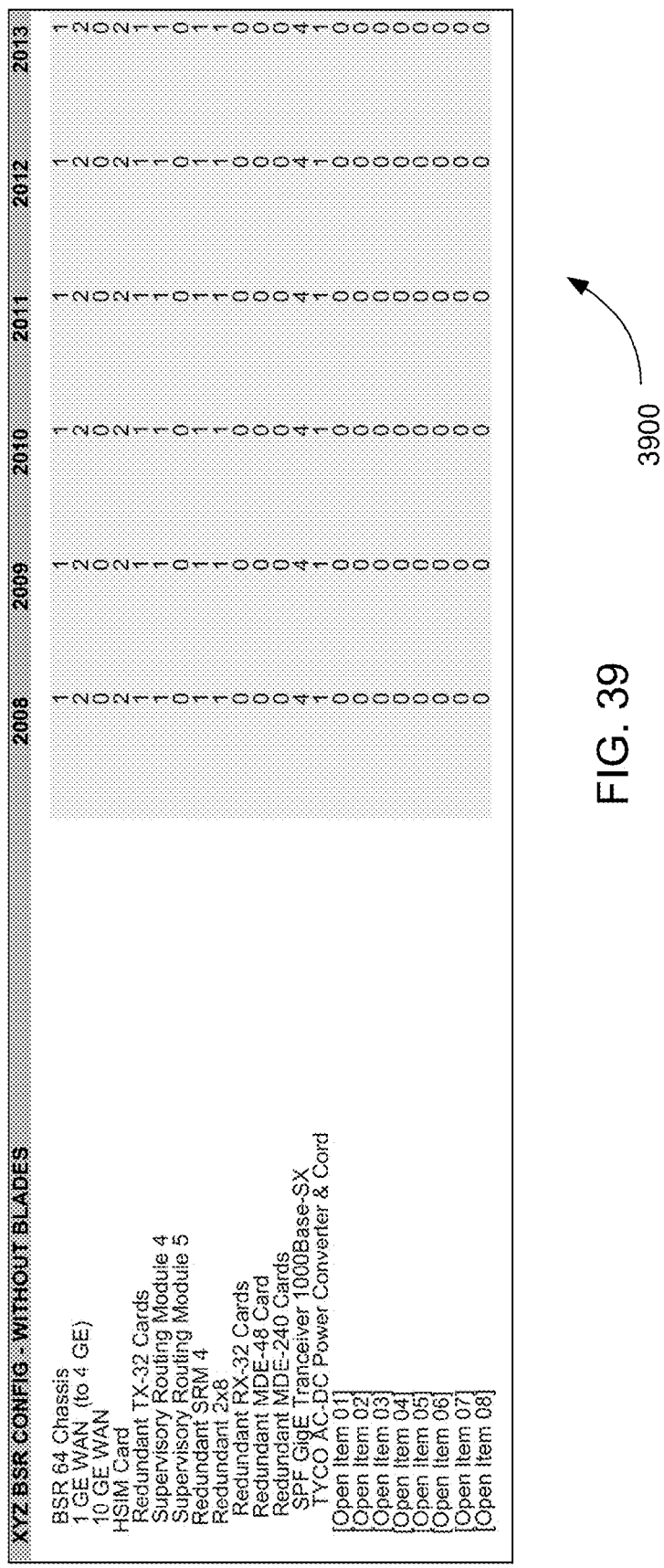
FIG. 39 shows a worksheet for updating CMTS and blade equipment cost according to an embodiment of the invention.

FIG. 39 shows a worksheet 3900 for updating CMTS and blade equipment cost according to an embodiment of the invention. The actual configuration, which is a per market configuration thereby allowing every market to be unique, is used.

In FIG. 39, a configuration is generated for a particular node or a particular market. Rather than using a top down approach, prior planners use a blended average looking at a full populated access device of 250,000 nodes. Ten line cards provide services to customers. Therefore, an estimate of $25,000 a line card would be used. If ten are available, a whole chassis may be folded up even though there is other equipment in the node. When no additional line cards could be fitted in the node, the node would have to be split or additional hardware would be needed. If the node grew beyond a certain count, additional hardware was added.

However, the projector model provides knowledge concerning how many actual subscribers there are, how many homes are passed, consumption usage is projected going forward rather than guessing at it and waiting for it to actually happen before an action is taken.

So instead of having extra capacity that is not being used, or instead of waiting until an action is required, the projections allows services to be planned and equipment ordered ahead of time without a significant period of the equipment just sitting around.

Each market has costs broken down by CMTS and blade as well as by the two major vendors, ABC and XYZ. If additional items need to be added to the CMTS chassis, they need to be added to the CMTS configuration section. Adding an item in the configuration section will automatically populate the item in the costs section. For example, in FIG. 38, there is 1 redundant TX-32 card in each XYZ BSR configuration. This number remains constant through all the years but the model allows the numbers to be changed year over year. ABC 10K configurations can be updated in a similar manner.

Figure 40:
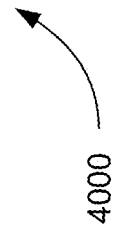
FIG. 40 shows a worksheet for updating equipment cost according to an embodiment of the invention.

FIG. 40 shows a worksheet 4000 for updating equipment cost according to an embodiment of the invention. The costs of each of the components listed in the configuration can be updated by changing the values accordingly. Currently, most markets follow a standard discount off of the list price to calculate the cost of the component. However, costs can be updated on a case-by-case basis by updating the value in the relevant cell. In FIG. 40, the cost for a subset of the components for a particular market is shown. While the model currently keeps the costs constant year over year, this is not a requirement and costs can be changed as needed.

Budget numbers are used to report the variance of the Projector forecasts from the EON budget. All budget numbers can be found on the Assumptions worksheet. There are three major sections that correspond to budget information, namely, overall budget by year, year-to-date actual spend and effective budget. These sections can be found starting on row 30 of the Assumptions worksheet.

The overall budget by year includes the actual budget over the entire time horizon and should, in theory, remain constant. The actual spend by market by year section reflects the money already spent and should be updated as updated numbers become available. The effective budget by year section reflects the remaining or effective budget by year and is a difference of the overall budget and the actual spend. Certain markets, such as Phoenix and Tucson, may be reported as a bundle. For these markets, the network share between markets table on the Assumptions page contains the percentage share for the individual markets in the bundle.

FIG. 41 shows a network share table 4100 according to an embodiment of the invention. The percentages are used to calculate the individual markets that are parts of bigger bundles. The first column identifies the market, the second column is the share of total households passed (HHP) and the third column is the share for a network group. Therefore an 86.6% share for Phoenix means that Phoenix contains 86.6% of all the homes passed in the combined Phoenix and Tucson markets.

The Projector Model has been formatted so that key equipment and financial formats can be reported easily. Most financial reports can be found on the "Financial Summary" work-sheet. There are a few different options for reporting forecasted capital expenditure depending on the level of granularity required.

FIG. 42 illustrates a table 4200 showing the capital expenditure by year and by major category according to an embodiment of the invention. At the highest level, the Financial Summary-PPT worksheet table breaks out the total forecast Capital Expenditure by year into the two major cost buckets: (1) Node Split cost and (2) CMTS cost. This break-down of the expenditure follows the EON budget model. This report also shows total yearly variance from the EON budget.

FIG. 43 illustrates a table 4300 showing the capital expenditure and budget variance by year and by major category according to an embodiment of the invention. The report shown in FIG. 43 adds Node Split and CMTS budget variance figures to the report above.

FIG. 44 is a table 4400 showing the total capital expenditure by market according to an embodiment of the invention. FIG. 45 is a table 4500 showing the node split expenditure by market according to an embodiment of the invention. FIG. 46 is a table 4600 showing the CMTS capital expenditure by market according to an embodiment of the invention. The three market level tables shown in FIGS. 44-46 report total capital expenditure, node split capital expenditure and CMTS capital expenditure at the market level. All three tables can be found on the Financial Summary worksheet starting at Row 57.

FIG. 47 is a table 4700 showing the network capital expenditure summary according to an embodiment of the invention. The capital expenditure report by network components is the most granular summary table that can be reported. This table can be found on the Financial Summary sheet starting on Row 5.

Figure 48:
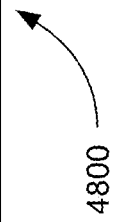
FIG. 48 shows the node split budget variance by market according to an embodiment of the invention.
Figure 49:
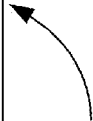
FIG. 49 shows the CMTS budget variance by market according to an embodiment of the invention.
Figure 50:
FIG. 50 shows the total budget variance by market according to an embodiment of the invention.

FIG. 48 is a table 4800 showing the node split budget variance by market according to an embodiment of the invention. FIG. 49 is a table 4900 showing the CMTS budget variance by market according to an embodiment of the invention. FIG. 50 is a table 5000 showing the total budget variance by market according to an embodiment of the invention. FIGS. 48-50 show the incremental and cumulative variances for each market.

FIG. 51 is a table 5100 showing a report for equipment forecasts according to an embodiment of the invention. The table summarizing equipment forecasts by year can be found on the Financial Summary worksheet starting on Row 171.

FIG. 52 is a table 5200 showing long range planning projections or managing the overall system according to an embodiment of the invention. The LRP Projections sheet shown in FIG. 52 contains subscriber information segmented by CHSI, CDT, CBI, and CBT services. The DOCSIS SUBSCRIBERS group sums the subscribers from each of the services. Each segment contains Starting Subscribers, Gross Adds, Monthly Churn Rate, Deactivations and Ending Subscribers. The Projector Model uses the growth rate in subscribers for each market to project the subscribers per node for all nodes in that market.

The LRP worksheet takes as inputs the following data:
Starting Subscribers for each market for the base/start year
Gross Subscriber Additions for each market for all years
Monthly churn for each market for the base/start year
Deactivations for each market for all years
Ending Subscribers for each market for all years The LRP worksheet calculates the starting subscribers, the average subscribers and the monthly churn. The starting subscribers for a given year are equal to the ending subscribers for the previous year. The model takes the first year starting subscriber data as input. The average subscribers are calculated as the average of starting and ending subscribers for a given year. The monthly churn is calculated as the deactivations for the year divided by the average subscribers for the year divided by 12, i.e., the number of months. For years where data is unavailable, the model uses a linear projection using the growth rate from the previous year To update the LRP data, data on the number of starting subscribers, the gross ads, the monthly churn, the number of deactivations and the number of ending subscribers is collected. For starting subscribers, the base year subscriber information for all markets is updated. For gross ads, the data for all markets for all years is updated. For the monthly churn, the base year churn rate for all markets is updated. For deactivations, the data for all markets for all years is updated. For ending subscribers, the data for all markets for all years is updated.

The Projector Model according to an embodiment of the invention provides a granular, bottoms-up approach to capacity planning and equipment migration based on several key methodology assumptions. First is capital expenditure minimization. Equipment should be added only on an as-needed basis to minimize equipment costs. The existing base in a head-end should be exhausted before any additional equipment is incremented. Next, the focus is MAC domain level processing. Topologies are analyzed at the MAC Domain level and individual node statistics and subscribers within the MAC Domain are aggregated before processing.

Geographical constraints are also considered. Topologies are analyzed within a given head-end. CMTS chasses are incremented only within the same head-end. RF Gateways are shared only with CMTS chasses within the same head-end. As necessary topology upgrading is another key consideration. In line with the as-needed processing approach, the projector model increments equipment only once a capacity/utilization threshold is crossed. The projector model does not add any capacity buffers.

The same tier mix should be applied across all nodes in a market. Each node in the market is assumed to have the same tier mix as specified by the tier inputs for that market. For configuration migrations, all changes in equipment configurations occur at the start of the year for which they are specified. Capacity processing only takes place after the configuration change has been made.

The optimal packing of CMTS chasses should be implemented. The projector model assumes that all CMTS that are read from the NCP are utilized optimally. This also assumes that the minimum number of line cards was used to support the service groups read in. The methodology also considers the dedicated bandwidth reservation. Bandwidth for CIR services is carved out of a channel's capacity before maximum allowable subscribers per channel areas calculated. Bandwidth reservations are aggregated to the service group level. Node splitting and de-combining assumptions are also a factor. Node splits are assumed to exactly halve both the subscriber and the homes passed in the parent node. Node de-combines will place the largest node in the newly created service group.

Figure 53:
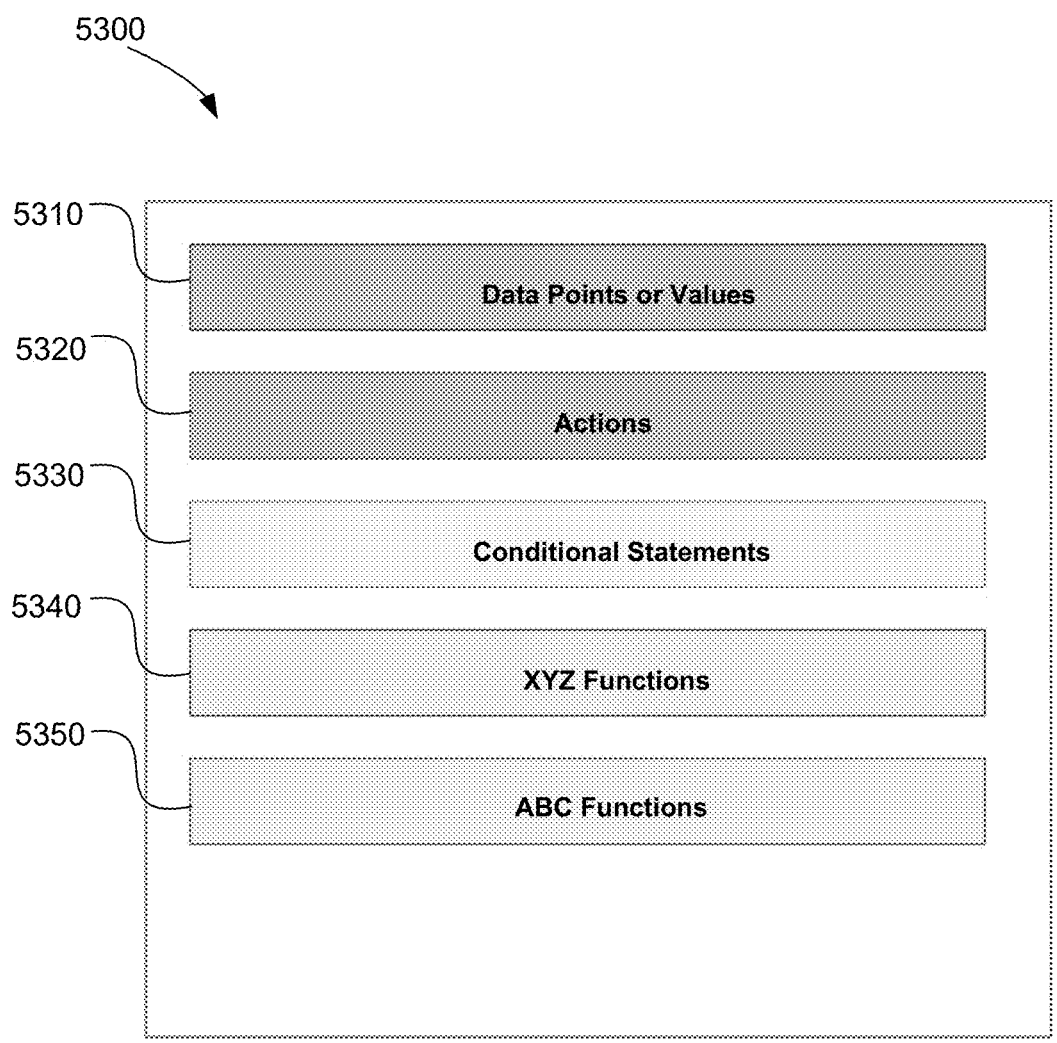
FIG. 53 is a flow chart of the overall process flow for the projector model according to an embodiment of the invention.

FIG. 53 is a flow chart 5300 of the overall process flow for the projector model according to an embodiment of the invention. Process Flows for Projector's core algorithm are provided. In FIG. 53, data points or values are collected 5310 and actions 5320. Conditional statements 5330 provide logic for modeling the network. XYZ functions 5340 and ABC functions 5350. Although some examples only show the process for downstream, a very similar algorithm or process applies for upstream. In addition, process flows are not exhaustive of all algorithm functions and operations. Process Flows instead capture the key operations at a high-level.

Figure 54:
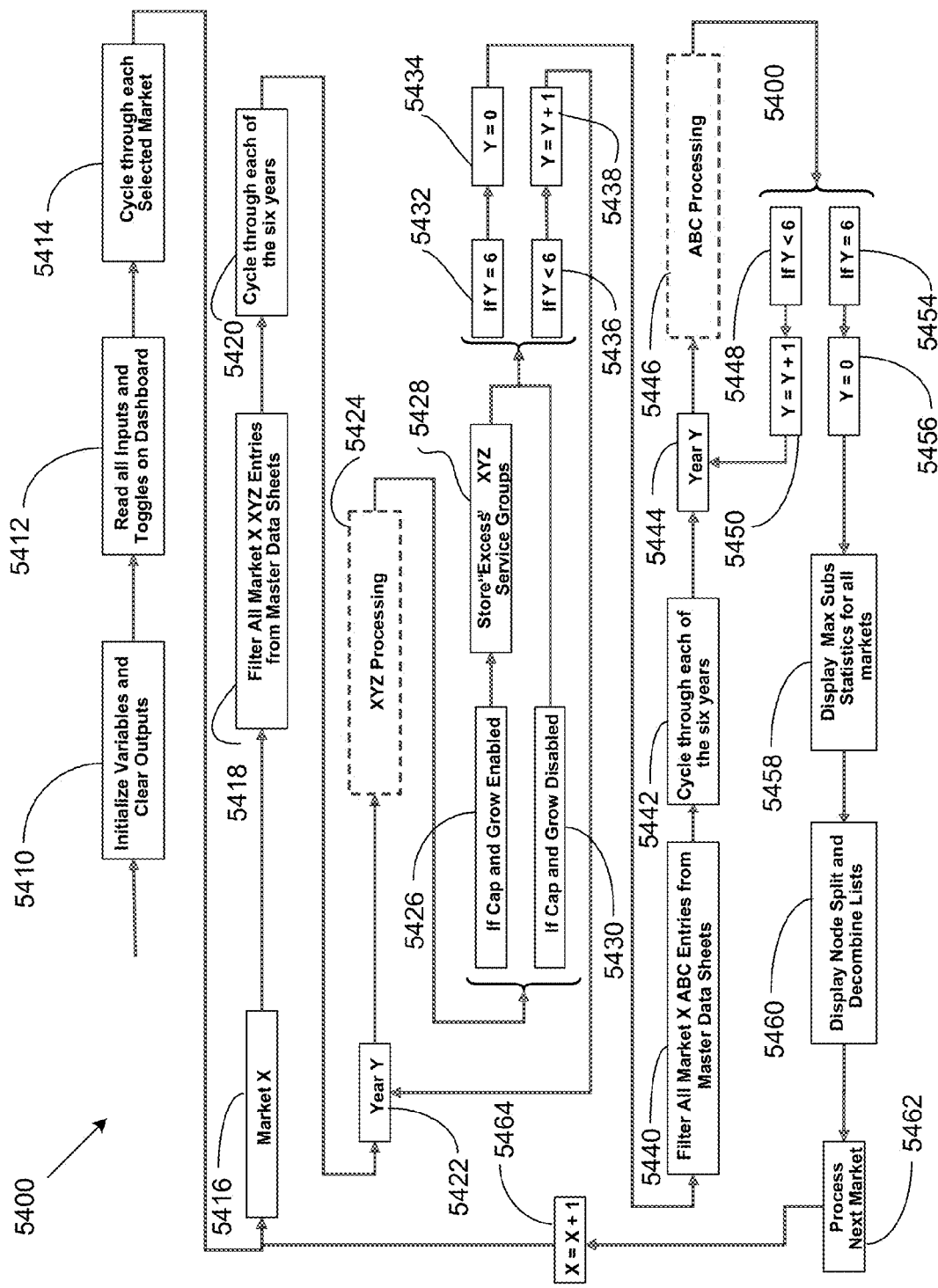
FIG. 54 shows the selected markets desired for the projector model according to an embodiment of the invention.

FIG. 54 is a flow chart 5400 showing the projector model for selected markets according to an embodiment of the invention. The variables are initialized and the outputs are cleared 5410. All inputs and toggles on the dashboard are read 5412. Each selected market is cycled through 5414.

For market X 5416, all market X XYZ entries from master data sheets are filtered 5418. Each of the six years is cycled through 5420. For year Y 5422, XYZ processing is performed 5424. If cap and grow are enabled 5426, then the process stores "excess" XYZ service groups 5428. If not 5430, continue. If Y=6 5432, then set Y=0 5434. If Y<6 5436, then Y=Y+1 5438.

All market X ABC entries from master data sheets are filtered 5440. Again, the process cycles through each of the six years 5442. For year Y 5444, perform ABC processing 5446. If Y<6 5448, then Y=Y+1 5450 and loop to ABC processing 5446. If Y=6 5454, then set Y=0 5456.

The number of maximum subscriber statistics for all markets is displayed 5458. The node split and decombine lists are displayed 5460. The next market is processed 5462 by incrementing X 5464.

Figure 55:
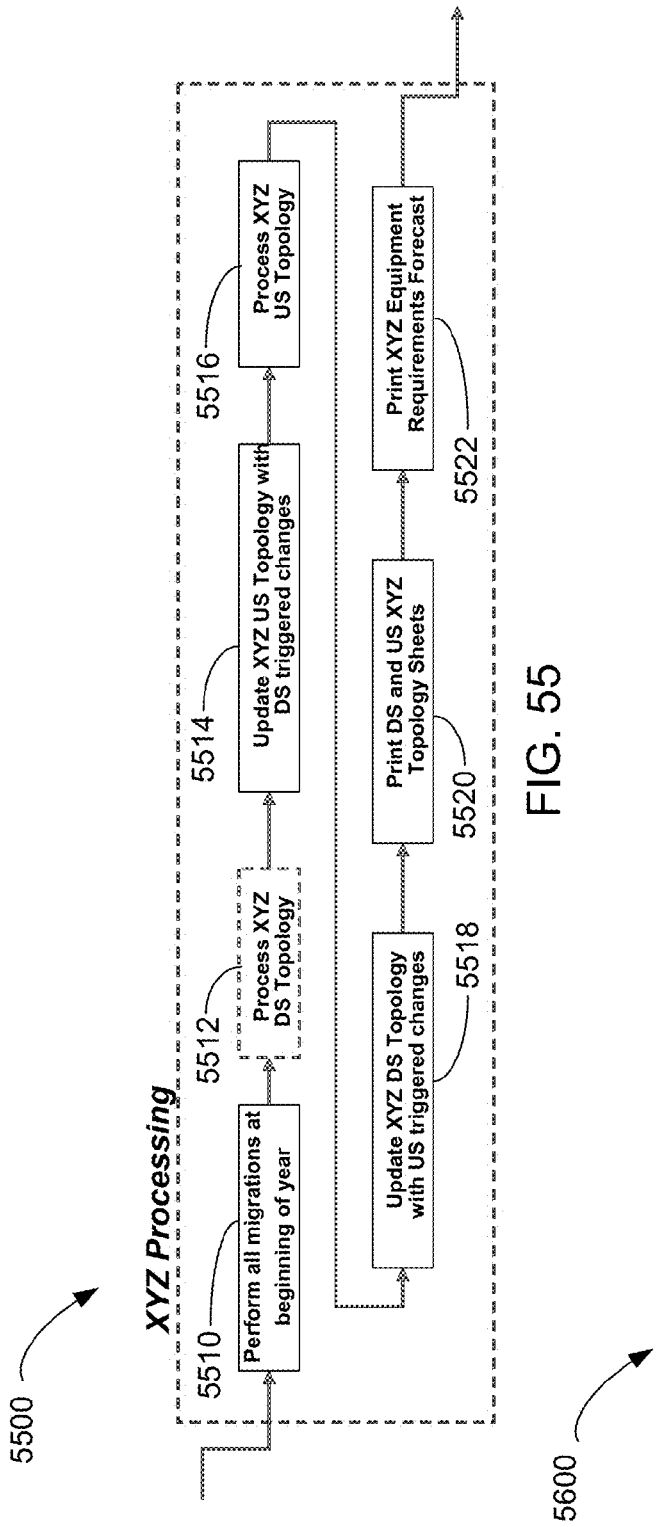
FIG. 55 shows the XYZ processing according to an embodiment of the invention.
Figure 56:
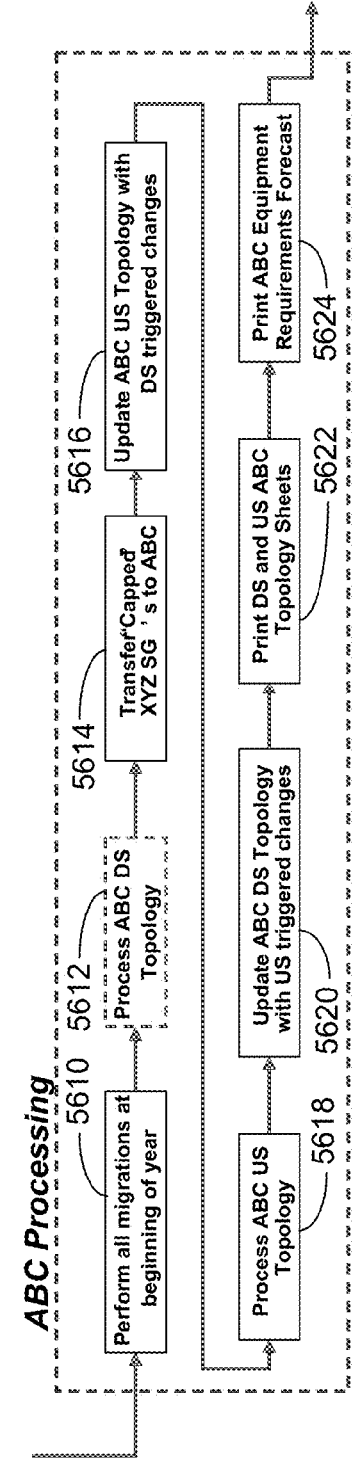
FIG. 56 illustrates the ABC processing according to an embodiment of the invention.

FIGS. 55-56 illustrate the flow charts for the ABC and XYZ processing according to an embodiment of the invention. In FIG. 55, XYZ processing 5500 will first be described. The first step is to perform all migrations at the beginning of the year 5510. Then, XYZ DS topology is processed 5512. The XYZ US topology with DS triggered changes is updated 5514. The XYZ US topology is processed 5516. The XYZ DS topology is updated with US triggered changes 5518. The DS and US XYZ topology sheets 5520 and the XYZ equipment requirements forecast 5522 are printed.

FIG. 56 illustrates the ABC processing 5600 according to an embodiment of the invention. For ABC processing, all migrations are performed at the beginning of the year 5610. ABC DS topology is processed 5612. Then, "capped" XYZ SGs are transferred to ABC 5614. The ABC US topology is updated with DS triggered changes 5616. ABC US topology is processed 5618. The ABC DS topology is updated with US triggered changes 5620. The DS and US ABC topology sheets 5622 and the ABC equipment requirements forecast 5624 are printed.

Figure 57:
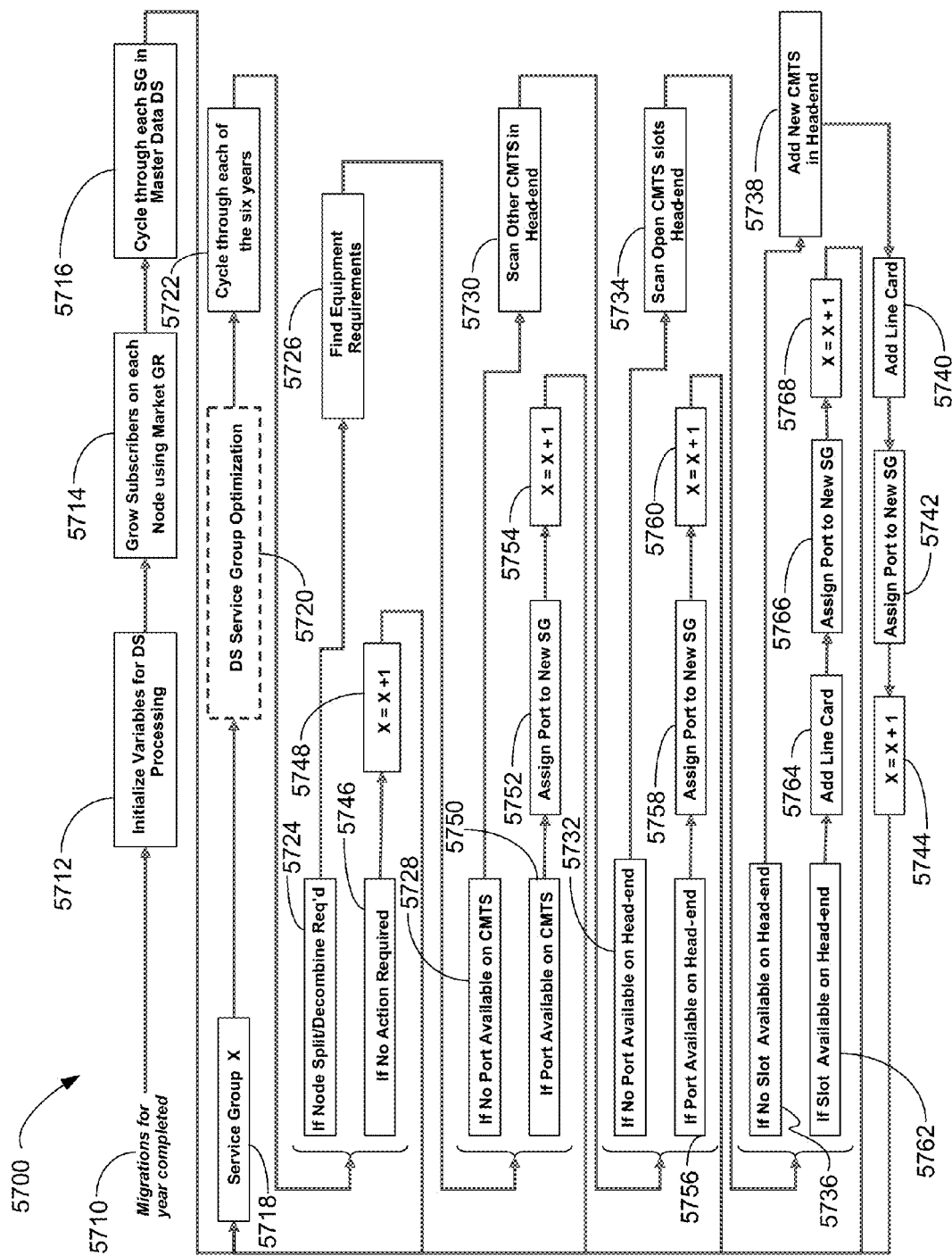
FIG. 57 is a flow chart of the process vendor DS topology.

FIG. 57 is a flow chart 5700 of the process vendor DS topology. In FIG. 57, the migrations for the year are completed 5710. The variables for DS processing are initialized 5712. Subscribers are grown on each node using the market growth rate 5714. Each SG in the master data DS is cycled through 5716. For service group X 5718, DS service group optimization is performed 5720. Each of the six years is cycled through 5722.

If node split decombine is required 5724, then the equipment requirements are determined 5726. If no port are available on the CMTS 5728, the other CMTS in head-end are scanned 5730. If no port is available on the head-end 5732, the open CMTS slots head-end is scanned 5734. If no slot is available on the head-end 5736, new CMTS is added in the head-end 5738, a line card is added 5740 and a port is added to the new SG 5742. Then, X is incremented 5744.

If no action required 5746, then X is incremented 5748. If a port is available on the CMTS 5750, then a port is assigned to a new SG 5752. Then, X is incremented 5754.

If a port is available on the head-end 5756, then assign a port to the new SG 5758. Then, X is incremented 5760.

If a slot is available on the head-end 5762, then add a line card 5764 and assign a port to the new SG 5766. Then, X is incremented 5768.

Figure 58:
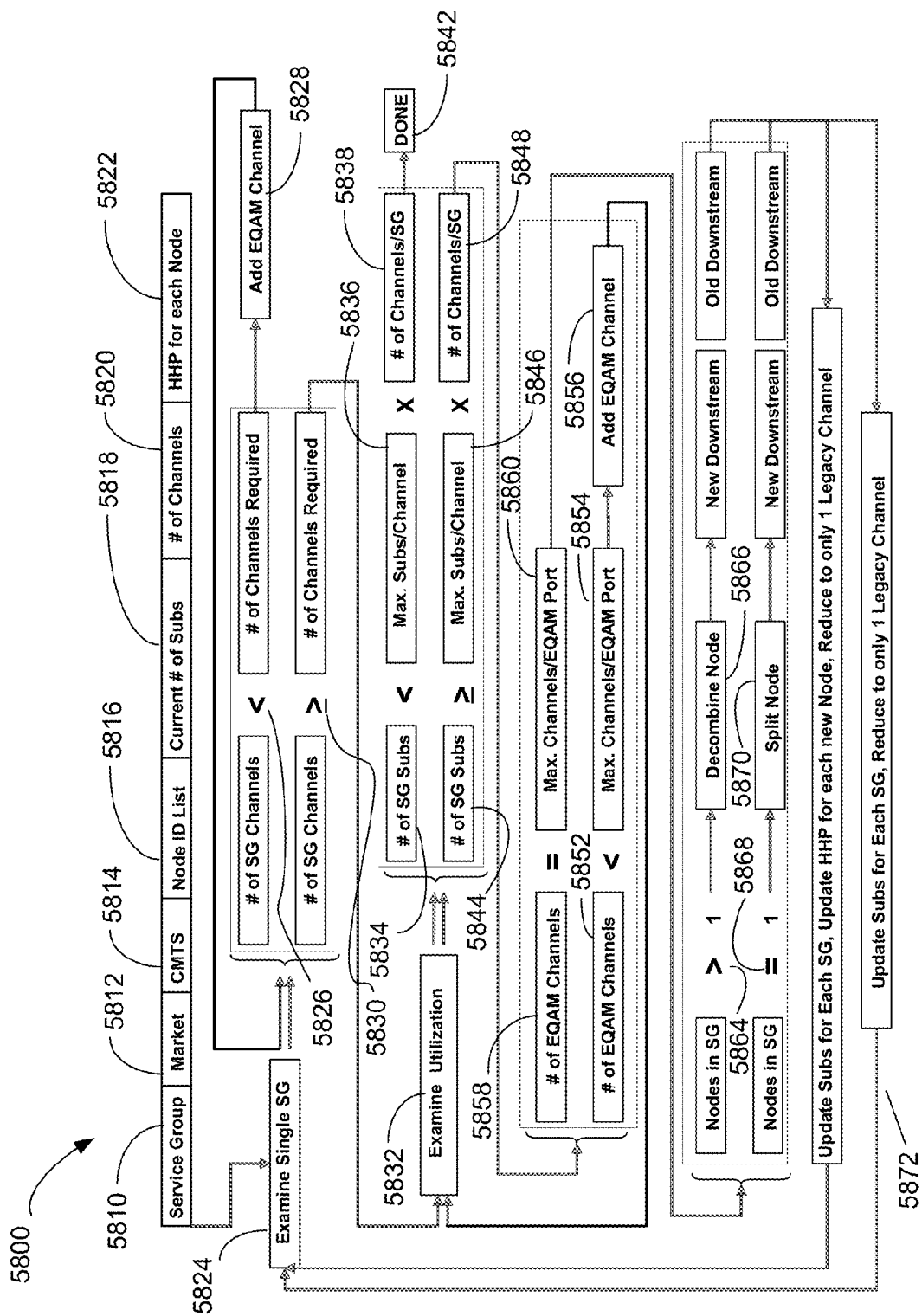
FIG. 58 is a flow chart showing the DS service group optimization.

FIG. 58 is a flow chart 5800 showing the DS service group optimization. Data that includes the service group 5810, market 5812, CMTS 5814, node ID list 5816, the current number of subscribers 5818, the number of channels 5820, and HHP for each node 5822 is provided. A single service group is then examined 5824. If the number of SG channels is less than the number of channels required 5826, then an EQAM channel is added 5828. If the number of SG channels is greater than or equal to the number of channels required 5830, then utilization is examined 5832.

Utilization is examined by first determining if the number of SG subscribers 5834 is less than the maximum number of subscribers per channel 5836 times the number of channels per service group 5838. If so, then terminate the process 5842.

If the number of SG subscribers 5844 is greater than or equal to the maximum number of subscribers per channel 5846 times the number of channels per service group 5848, then examine the EQAM channel. If the number of EQAM Channels 5852 is less than the maximum number of channels per EQAM port 5854, than add an EQAM channel 5856 and loop to the utilization examination step 5832. If the number of EQAM Channels 5858 is equal to the maximum number of channels per EQAM port 5860, examine the nodes in the SG. If nodes in SG is greater than one 5864, then decombine the node into new downstream and old downstream 5866. If nodes in SG are equal to one 5868, then split the node into new downstream and old downstream 5870. Update subscribers for each SG, update HHP for each new node, and reduce to only 1 legacy channel 5872. Then, return to examine another SG 5824.

Figure 59:
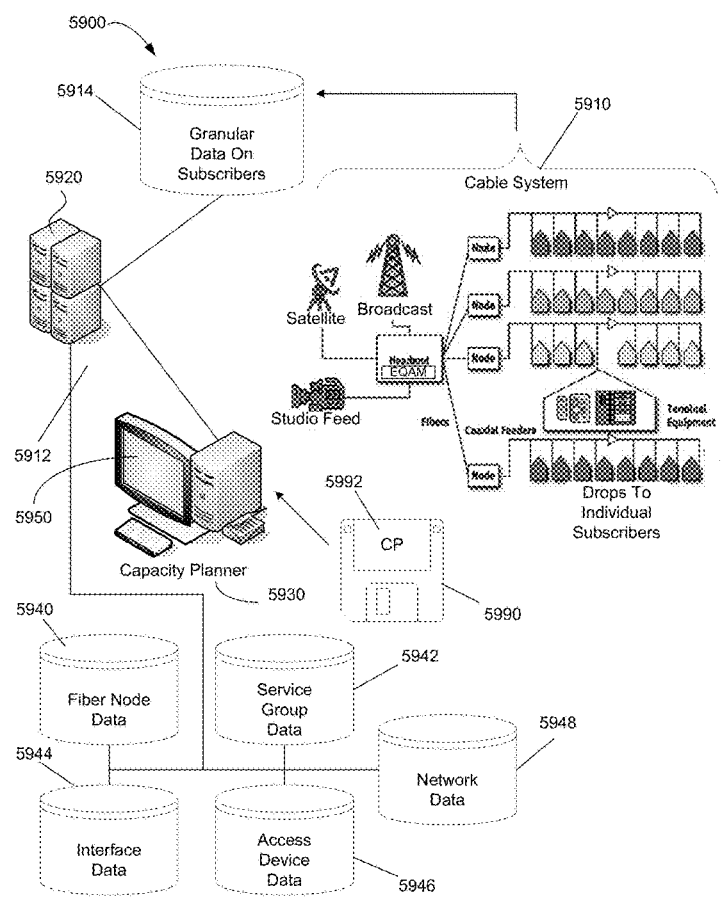
FIG. 59 is a block diagram of a system 5900 according to an embodiment of the invention.

FIG. 59 is a block diagram of a system 5900 according to an embodiment of the invention. In FIG. 59, granular data is collected from the cable system 5910. The granular data may include data on users, demographic parameters, speed tiers, application mixes, etc. The data may be collected in a database system 5912 having storage 5914 for the granular data. Capacity planners 5930 may access the servers 5920 of the database system 5912 to reconstruct the consumption down at the user level. Rather than take such a top down view of the network capacity world, a bottom up view is reconstructed by capacity planners 5930.

From the granular data, the capacity planner 5930 uses the planning system to project bandwidth capacity planning upwards. For example, how much bandwidth each individual user would consume is gathered and then a model is built using the system to move upwards and determine how much capacity is needed for a particular fiber node 5940. Capacity for a group of fiber nodes, e.g., a service group 5942, is determined using the data associated with particular fiber nodes. This process then continues up to an interface 5944 on an access device, a particular access device 5946, and thereon through to the network 5948. Accordingly, a determination of how much actual consumption, whether on an application basis, on a group, on granular basis such as protocols or even on the cable side itself.

Once these calculations have been made, the model 5950 run by the capacity planners 5930 allows projections to be made and a compound annual growth rate may be determined. The compound annual growth rate may be used to make projections based on what is currently known. This model 5950 may be applied to the application usage, to the overall usage, to whatever specific portion of that consumption is of interest. By pushing this analysis forward, projections may be made further out in time what the actual demand will be so that the plant is not overbuilt unless so desired. If overbuilding the plant is desired, the model allows planners to move the end of the line more towards the consumption side, i.e., the demand curve.

Planners 5930 may also decide to move the line more towards the retail curve so that an understanding of what that impact of such a move would be on user experience, e.g., what will be the impact on the number of customer trouble tickets that are generated. Moreover, actually knowledge of vendor hardware may be used to assign hardware and cause actions to occur accordingly, e.g., node splits, etc.

Embodiments may be implemented in a suitable computing environment. Embodiments may also be implemented in combination with other types of computer systems and program modules. Generally, program modules include routines, programs, components, data structures, and other types of structures that perform particular tasks or implement particular abstract data types. By way of example, computer readable media 5990 can include computer storage media and communication media. Computer storage media 5990 includes volatile and nonvolatile, removable and non-removable media implemented in any method or technology for storage of information 5992, such as computer readable instructions, data structures, program modules or other data. Computer storage media 5990 typically embodies computer readable instructions, data structures, and program modules. Moreover, those skilled in the art will appreciate that the invention may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network.

Embodiments implemented on computer-readable media 5990 may refer to a mass storage device, such as a hard disk or CD-ROM drive. However, it should be appreciated by those skilled in the art that computer-readable media can be any available media that can be accessed or utilized by a processing device, e.g., server or communications network provider infrastructure.

By way of example, and not limitation, computer-readable media 5990 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by a processing device.

As mentioned briefly above, a number of program modules and data files may be stored and arranged for controlling the operation of processing devices. Thus, processing devices, such as server 5920, may be configured to execute instructions that perform the operations of embodiments of the present invention.

It should also be appreciated that various embodiments of the present invention can be implemented (1) as a sequence of computer implemented acts or program modules running on a processing device and/or (2) as interconnected machine logic circuits or circuit modules within the processing devices. The implementation is a matter of choice dependent on the performance requirements. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Accordingly, embodiments of the invention use the available data to build and associate the requirements from the customer upwards rather than the network downwards. Thus, rather than determining how much network capacity there is and how much a subscriber can have, embodiments of the present invention project how much bandwidth is needed and identifies what it will take to provide that bandwidth.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of planning capacity requirements of a telecommunications network, comprising:
    collecting granular data at a user-level including user bandwidth consumption and at a system-level including equipment associated with provisioning of telecommunication services over a telecommunications network;
    storing the collected user-level data in a database;
    presenting an interface for receiving selection of modeling parameters to apply to the collected user-level data in the database to allow a plurality of network scenarios to be analyzed, including a subscriber count and market selection;
    generating model results specific to the selected modeling parameters by first reconstructing bandwidth consumption at the user-level based on the user-level granular data and subsequently making projections of bandwidth capacity needs upstream through the telecommunications network from the reconstructed bandwidth consumption at the user-level; and
    combining or splitting nodes based on a summary of input data associated with the generated model results specific to the selected modeling parameters and a summary of output data projecting network upgrade requirements based on the generated model results specific to the selected modeling parameters.

2. The method of claim 1, wherein the user-level granular data includes subscriber data, demographic parameters, speed tiers, and application mixes.

3. The method of claim 1, wherein the collected user-level granular data includes a determination of bandwidth consumed by individual users.

4. The method of claim 1, wherein the rendering on the interface a summary of output data projecting network upgrade requirements comprises presenting a periodic projection of topology and equipment modification requirements according to the generated model results specific to the selected modeling parameters.

5. The method of claim 1, wherein the generating model results specific to the selected modeling parameters by first reconstructing bandwidth consumption at the user-level based on the user-level granular data and subsequently making projections of bandwidth capacity needs upstream through the telecommunications network from the reconstructed bandwidth consumption at the user-level further comprises determining a capacity for a selected group of fiber nodes forming a service group.

6. The method of claim 5, wherein the determining capacity for the selected group of fiber nodes forming the service group further comprises determining capacity for a selected access device.

7. The method of claim 6, wherein the determining capacity for a selected access device further comprises determining actual bandwidth consumption associated with a network parameter.

8. The method of claim 7, wherein the determining actual bandwidth consumption associated with a network parameter further comprises determining actual bandwidth consumption on an application basis, on a group, on a protocol or on a selected fiber cable.

9. The method of claim 1, wherein the generating model results specific to the selected modeling parameters by first reconstructing bandwidth consumption at the user-level based on the user-level granular data and subsequently making projections of bandwidth capacity needs upstream through the telecommunications network from the reconstructed bandwidth consumption at the user-level further comprises calculating a historical growth rate.

10. The method of claim 9, wherein the generating model results specific to the selected modeling parameters by first reconstructing bandwidth consumption at the user-level based on the user-level granular data and subsequently making projections of bandwidth capacity needs upstream through the telecommunications network from the reconstructed bandwidth consumption at the user-level further comprises using the calculated historical growth rate to generate a projected compound annual growth rate.

11. The method of claim 1, wherein the generating model results specific to the selected modeling parameters by first reconstructing bandwidth consumption at the user-level based on the user-level granular data and subsequently making projections of bandwidth capacity needs upstream through the telecommunications network from the reconstructed bandwidth consumption at the user-level further comprises manipulating capacity changes to move projected bandwidth consumption relative to a retail curve or a demand curve to identify an impact on user experience and equipment needs.

12. A non-transitory computer storage medium including executable instructions which, when executed by a processor, provide capacity planning associated with a telecommunications network by:
    collecting granular data at a user-level including user bandwidth consumption and at a system-level including equipment associated with provisioning of telecommunication services over a telecommunications network;
    storing the collected user-level data in a database;
    presenting an interface for receiving selection of modeling parameters to apply to the collected user-level data in the database to allow a plurality of network scenarios to be analyzed, including a subscriber count and market selection;
    generating model results specific to the selected model modeling parameters by first reconstructing bandwidth consumption at the user-level based on the user-level granular data and subsequently making projections of bandwidth capacity needs upstream through the telecommunications network from the reconstructed bandwidth consumption at the user-level; and
    combining or splitting nodes based on a summary of input data associated with the generated model results specific to the selected model modeling parameters and a summary of output data projecting network upgrade requirements based on the generated model results specific to the selected model modeling parameters.

13. The non-transitory computer storage medium of claim 12, wherein the rendering on the interface a summary of output data projecting network upgrade requirements comprises presenting a periodic projection of topology and equipment modification requirements according to the generated model results specific to the selected modeling parameters.

14. The non-transitory computer storage medium of claim 12, wherein the generating model results specific to the selected modeling parameters by first reconstructing bandwidth consumption at the user-level based on the user-level granular data and subsequently making projections of bandwidth capacity needs upstream through the telecommunications network from the reconstructed bandwidth consumption at the user-level further comprises, determining a capacity for a selected group of fiber nodes forming a service group, determining capacity for a selected access device and determining actual consumption associated with a network parameter.

15. The non-transitory computer storage medium of claim 12, wherein the generating model results specific to the selected modeling parameters by first reconstructing bandwidth consumption at the user-level based on the user-level granular data and subsequently making projections of bandwidth capacity needs upstream through the telecommunications network from the reconstructed bandwidth consumption at the user-level further comprises manipulating capacity changes to move projected bandwidth consumption relative to a retail curve or a demand curve to identify an impact on user experience and equipment needs.

16. A telecommunications network capacity planning system, comprising:
- a telecommunications network including a telecommunications services provider, subscribers and a network coupling the telecommunications services provider and the subscribers for provisioning of telecommunications services;
- a database system for collecting and storing granular data at a user-level including user bandwidth consumption and at a system-level including equipment associated with provisioning of telecommunication services over the telecommunications network; and
- a processor coupled to the database system, the processor presenting an interface for receiving selection of modeling parameters to apply to the collected user-level data in the database to allow a plurality of network scenarios to be analyzed, including a subscriber count and market selection, generating model results specific to the selected modeling parameters by first reconstructing bandwidth consumption at the user-level based on the user-level granular data and subsequently making projections of bandwidth capacity needs upstream through the telecommunications network from the reconstructed bandwidth consumption at the user-level and combining or splitting nodes based on a summary of input data associated with the generated model results specific to the selected modeling parameters and a summary of output data projecting network upgrade requirements based on the generated model results specific to the selected modeling parameters.

17. The system of claim 16, wherein the processor further presents a periodic projection of topology and equipment modification requirements according to the generated model results specific to the selected modeling parameters.

18. The system of claim 16, wherein the processor generates model results specific to the selected modeling parameters by first reconstructing bandwidth consumption at the user-level based on the user-level granular data and subsequently making projections of bandwidth capacity needs upstream through the telecommunications network from the reconstructed bandwidth consumption at the user-level by further using the determined capacity for a fiber node to determine a capacity for a selected group of fiber nodes forming a service group, using the determined capacity of the service group to determine capacity for a selected access device and using the determined capacity of the selected access device to determine actual consumption associated with a network parameter.

19. The system of claim 16, wherein the processor generates model results specific to the selected modeling parameters by first reconstructing bandwidth consumption at the user-level based on the user-level granular data and subsequently making projections of bandwidth capacity needs upstream through the telecommunications network from the reconstructed bandwidth consumption at the user-level by further manipulating capacity changes to move projected bandwidth consumption relative to a retail curve or a demand curve to identify an impact on user experience and equipment needs.

* * * * *